(12) United States Patent
Butler et al.

(10) Patent No.: US 6,791,610 B1
(45) Date of Patent: Sep. 14, 2004

(54) UNCOOLED FOCAL PLANE ARRAY SENSOR

(75) Inventors: Neal R. Butler, Acton, MA (US); Charles M. Marshall, North Andover, MA (US)

(73) Assignee: Lockheed Martin IR Imaging Systems, Inc., Lexington, MA (US)

( * ) Notice: Subject to any disclaimer, the term of this patent is extended or adjusted under 35 U.S.C. 154(b) by 0 days.

(21) Appl. No.: 09/051,180

(22) PCT Filed: Oct. 24, 1996

(86) PCT No.: PCT/US96/17028
§ 371 (c)(1),
(2), (4) Date: Sep. 14, 1998

(87) PCT Pub. No.: WO97/15813
PCT Pub. Date: May 1, 1997

(51) Int. Cl.[7] .................................................. H04N 3/14

(52) U.S. Cl. ....................................... 348/297; 348/294

(58) Field of Search ................................ 348/294, 295, 348/297, 302, 308, 307

(56) References Cited

U.S. PATENT DOCUMENTS

| | | | |
|---|---|---|---|
| 3,621,258 A | 11/1971 | Dreitzler | |
| 3,665,190 A | 5/1972 | Kotera et al. | |
| 3,891,843 A | 6/1975 | Parkin | 250/203 R |
| 3,961,325 A | 6/1976 | Kendall et al. | |
| 3,971,015 A | 7/1976 | Hornak | 340/347 |
| 3,973,146 A | 8/1976 | Arnold et al. | 357/26 |
| 4,176,398 A | 11/1979 | Rider | |
| 4,276,474 A | 6/1981 | Crawford | 250/349 |
| 4,298,887 A | 11/1981 | Rode | 358/113 |
| 4,369,463 A | 1/1983 | Anastassiou et al. | 358/135 |

(List continued on next page.)

FOREIGN PATENT DOCUMENTS

| | | | |
|---|---|---|---|
| EP | 0534769 | 3/1993 | .......... H04N/5/217 |
| FR | A-2 554 999 | 5/1985 | ............ H04N/3/14 |
| GB | A-2 202 702 | 9/1988 | ............ H03M/1/46 |
| WO | WO 90/16082 | 12/1990 | |
| WO | WO92/06561 | 4/1992 | |
| WO | WO93/09414 | 5/1993 | |
| WO | WO 93/18492 | 9/1993 | ........... G08B/13/19 |
| WO | WO93/26050 | 12/1993 | |
| WO | WO94/00950 | 1/1994 | |
| WO | WO 94/00950 | 1/1994 | ............ H04N/5/33 |

OTHER PUBLICATIONS

Wood et al, Integrated Uncooled Infrared Detector Imaging Arrays, Jun. 1992, Honwywell Inc., IEEE, pp. 132–135.*

Marshall et al, Infrared Sensor Technology, 1997, IEEE, pp. 1715–1716.*

International Search Report from PCT Application PCT/US96/17028.

Co-pending U.S. patent application, Ser. No. 08/973,058, filed May 26, 1998, Neal R. Butler, "Monolithic Analog--to-Digital Converter", Attorney Docket No.: L0501/7020.

(List continued on next page.)

Primary Examiner—Wendy R. Garber
Assistant Examiner—Jacqueline Wilson
(74) Attorney, Agent, or Firm—Wolf Greefield & Sacks, P.C.; James H. Morris

(57) ABSTRACT

A focal plane array sensor includes optics located along an optical path, for transmitting radiation. A focal plane array and integrated circuit, located along the optical path for receiving the transmitted radiation, responsively produces image signals from the transmitted radiation. The integrated circuit includes apparatus for converting the image signals into digital image data at digital image data outputs.

30 Claims, 23 Drawing Sheets

U.S. PATENT DOCUMENTS

| | | | |
|---|---|---|---|
| 4,380,755 A | 4/1983 | Endlicher et al. | |
| 4,513,390 A | 4/1985 | Walter et al. | 364/900 |
| 4,587,426 A | 5/1986 | Munier et al. | |
| 4,589,024 A | 5/1986 | Koch et al. | |
| 4,609,824 A | 9/1986 | Munier et al. | |
| 4,628,364 A | 12/1986 | Koch | |
| 4,652,766 A | 3/1987 | Wang et al. | 250/370 |
| 4,654,622 A | 3/1987 | Foss et al. | 338/14 |
| 4,659,928 A | 4/1987 | Tew | 250/370 |
| 4,679,068 A | 7/1987 | Lillquist et al. | |
| 4,684,812 A | 8/1987 | Tew et al. | 250/370 |
| 4,686,373 A | 8/1987 | Tew et al. | 250/370 |
| 4,739,409 A | 4/1988 | Baumeister | 358/213 |
| 4,745,278 A | 5/1988 | Hanson | |
| 4,752,694 A | 6/1988 | Hegel, Jr. et al. | 250/578 |
| 4,754,139 A | 6/1988 | Ennulat et al. | 250/332 |
| 4,792,661 A | 12/1988 | Schmidtchen et al. | |
| 4,792,681 A | 12/1988 | Hanson | 250/338 |
| 4,808,822 A | 2/1989 | Manning et al. | |
| 4,831,257 A | 5/1989 | McClelland et al. | |
| 4,879,598 A | 11/1989 | Seto | |
| 4,902,895 A | 2/1990 | Hanson | 250/338.4 |
| 4,922,116 A | 5/1990 | Grinberg et al. | |
| 4,956,686 A | 9/1990 | Borrello et al. | |
| 4,967,082 A | 10/1990 | Cooke et al. | 250/349 |
| 4,991,109 A | 2/1991 | Crookshanks | 364/518 |
| 4,991,127 A | 2/1991 | Crookshanks | 364/518 |
| 5,010,251 A | 4/1991 | Grinberg et al. | 250/332 |
| 5,021,663 A * | 6/1991 | Hornbeck | 250/349 |
| 5,045,685 A | 9/1991 | Wall | 250/208.1 |
| 5,084,704 A | 1/1992 | Parrish | 341/164 |
| 5,129,595 A | 7/1992 | Thiede et al. | 244/3.16 |
| 5,134,474 A | 7/1992 | Hanafusa et al. | 358/113 |
| 5,166,810 A | 11/1992 | Sorimachi et al. | 358/462 |
| 5,175,802 A | 12/1992 | Crookshanks | 395/100 |
| 5,185,883 A | 2/1993 | Ianni et al. | 395/575 |
| 5,200,623 A | 4/1993 | Cannata | 250/338.1 |
| 5,201,582 A | 4/1993 | Lesniak | 374/45 |
| 5,204,761 A | 4/1993 | Gusmano | |
| 5,216,510 A | 6/1993 | Amingual et al. | 358/213.1 |
| 5,268,576 A | 12/1993 | Dudley | 250/332 |
| 5,288,649 A | 2/1994 | Keenan | 437/3 |
| 5,300,915 A | 4/1994 | Higashi et al. | |
| 5,326,726 A | 7/1994 | Tsang et al. | |
| 5,367,167 A | 11/1994 | Keenan | |
| 5,369,280 A | 11/1994 | Liddiard | |
| 5,389,788 A | 2/1995 | Grinberg et al. | 250/331 |
| 5,399,889 A | 3/1995 | Miyake et al. | |
| 5,420,419 A | 5/1995 | Wood | 250/338.4 |
| 5,442,176 A | 8/1995 | Eckel, Jr. et al. | 250/338.4 |
| 5,446,284 A | 8/1995 | Butler et al. | 250/332 |
| 5,486,698 A | 1/1996 | Hanson et al. | 250/332 |
| 5,489,776 A | 2/1996 | Lung | 250/338.4 |
| 5,512,748 A | 4/1996 | Hanson | 250/332 |
| 5,532,484 A | 7/1996 | Sweetser et al. | 250/332 |
| 5,541,412 A | 7/1996 | Tanaka et al. | |
| 5,554,849 A * | 9/1996 | Gates | 250/370.08 |
| 5,559,332 A | 9/1996 | Meissner et al. | |
| 5,563,405 A | 10/1996 | Woolaway, II et al. | 250/208.1 |
| 5,572,029 A | 11/1996 | Walker et al. | |
| 5,578,826 A | 11/1996 | Walker et al. | |
| 5,591,973 A | 1/1997 | Masarik et al. | 250/332 |
| 5,600,369 A | 2/1997 | Cazaux et al. | 348/218 |
| 5,650,622 A | 7/1997 | Ookawa et al. | |
| 5,656,848 A | 8/1997 | Beratan et al. | |
| 5,698,852 A | 12/1997 | Tanaka et al. | 250/332 |
| 5,756,999 A | 5/1998 | Parrish et al. | 250/332 |

OTHER PUBLICATIONS

Co–pending U.S. patent application, Ser. No. 08/981,109, filed May 26, 1998, Neal R. Butler, "Digital Offset Corrector", Attorney Docket No.: L0501/7021.

Co–pending U.S. patent application, Ser. No. 09/011,942, filed Aug. 24, 1998, Neal R. Butler "Bolometric Focal Plane Array", Attorney Docket No.: L0501/7022.

Abstract of foreign patent No. EPA–0324925, Jul. 26, 1989, Mitsubishi Denki.

Abstract of foreign patent No., JP 57–124726, Aug. 3, 1982, Mitsubishi Denki.

Abstract of foreign patent No. JP 3–179977, Aug. 5, 1991, Mitsubishi Elec. Corp.

Abstract of foreign patent No. JP 6–86174, Mar. 25, 1994, NEC Corp.

Abstract of foreign patent No. JP 3–289777, Dec. 19, 1991, NEC Corp.

International Search Report issued in International Patent Application PCT/US96/13853, filed Aug. 30, 1996.

IEEE Journal of Solid–State Circuits, vol. 30, No. 6, Jun. 1, 1995, pp. 710–714, Holman, W.T., et al., "A Compact Low Noise Operational Amplifier for a 1.2 MUM Digital CMOS Technology".

International Search Report issued in International Patent Application PCT/US96/11014 Filed Jun. 28, 1996.

O.B. Milgrome et al., "A 12 Bit Analog to Digital Converter for VLSI Applications in Nuclear Science", 1992, pp. 771–775, IEEE Transactions on Nuclear Science, vol. 39, No. 4.

O.B. Milgrome et al., "A Monolithic CMOS 16 Channel, 12 Bit, 10 Microsecond Analog to Digital Integrated Circuit," Aug. 1993, pp. 721–723, IEEE Transactions on Nuclear Science, vol. 40, No. 4.

N. Butler et al., "Dual Use, Low Cost Uncooled Microbolometer Imaging System," Jul. 12, 1995, Presented at SPIE, San Diego, CA.

N. Butler et al., "Advanced Microbolometer Digital Output Focal Plane Array," Jul. 1996.

C. Marshall et al., "Uncooled Microbolometer Imaging Sensors".

* cited by examiner

UNCOOLED FOCAL PLANE ARRAY SENSOR

BACKGROUND OF THE INVENTION

1. Field of the Invention

The invention relates to thermal imaging systems and, more particularly, to a microcomputer based microbolometer array uncooled focal plane array sensor.

2. Discussion of the Related Art

Thermal imaging systems are useful for a number of low light level applications such as night vision, and for imaging during conditions of reduced visibility, or for thermal image viewing for purposes of process or conditioning monitoring in industrial or residential environments. These imagers generally produce a two dimensional real time display for the operator to view. The real time images allow the user to view objects and/or scenery under conditions where the human eye would not normally function or to see thermal signatures of objects.

Some focal plane array sensors operate using an image intensifier tube or cryogenically cooled sensor. Image intensifier tubes amplify existing visible and near visible light having wavelengths in the range of 0.4 microns to 1.0 micron. Such an image intensifier sensor has several limitations. Because image intensifier sensors amplify existing light, they cannot work in total darkness. They also experience washout when there are sudden flashes of light or high ambient lighting. Such sensors are unable to detect signals through obstacles such as camouflage or smoke. Further, image intensifier tubes do not perform hot spot detection which is an important function for some imaging applications.

Other conventional imaging systems amplify visible and near infrared radiation at night to create images. This type of radiation amplification is typically accomplished with photomultiplier tubes. A photomultiplier tube amplifies light having a wavelength in the range of, for example, 0.4 microns to 1.0 micron, using micro-channel devices. Available microchannel devices are self contained with a photosensitive input surface on one side and an output display surface on the other. No cooling is required.

Other thermal vision devices utilize two dimensional infrared focal plane arrays such as PtSi, Ins and HgCdTe operating at cryogenic temperatures. Unfortunately, these focal planes require complicated cooling systems.

Other focal plane arrays such as pyroelectric arrays and ferroelectric arrays are also used for night vision devices. These devices utilize focal plane arrays that are AC coupled and require mechanical scanners or choppers to create infrared images. Because such focal plane arrays do not require complicated cooling systems they are typically referred to as "uncooled" focal plane arrays. Unfortunately they are heavy have reduced sensitivity and consume an undesirable amount of power in comparison to other sensors and to the uncooled sensor of the present invention.

In order to overcome drawbacks associated with conventional apparatus it is, therefore, desirable to have a self-contained, low cost, low power consumption light weight, portable thermal sensor that collects scene radiation in the visible to infrared range, outputs digital image data and creates a real time visible display. It is also desirable to have a sensor wherein images are created with the use of a microbolometer focal plane array having a digital image data output integrated into a single chip, processing electronics, power supply and display.

SUMMARY OF THE INVENTION

The present invention provides a staring focal plane array sensor comprising optics located along an optical path, for transmitting radiation. A focal plane array and integrated circuit, located along the optical path for receiving the transmitted radiation, responsively produces image signals from the transmitted radiation. The integrated circuit includes means for converting the image signals into digital image data at digital image data outputs.

In one aspect of the invention, the present invention provides an uncooled focal plane array sensor comprising a microbolometer focal plane array integrated into a semiconductor circuit with a digital image output in a package of modular construction having smaller size, lighter weight, and lower power consumption than prior art devices. The uncooled focal plane array may be tailored to operate in the 8 to 14 micron wavelength region on naturally occurring scene radiation Since it does not need visible light, it can operate in total darkness where image intensifiers cannot. It can also operate during the daytime without wash out. The focal plane array of the invention does not require cooling of a continuous mechanical chopper.

Other objects, features and advantages of the present invention will become apparent to those skilled in the art through the description of the preferred embodiment, claims and drawings herein wherein like numerals refer to like elements.

DETAILED DESCRIPTION

Figure 1A:
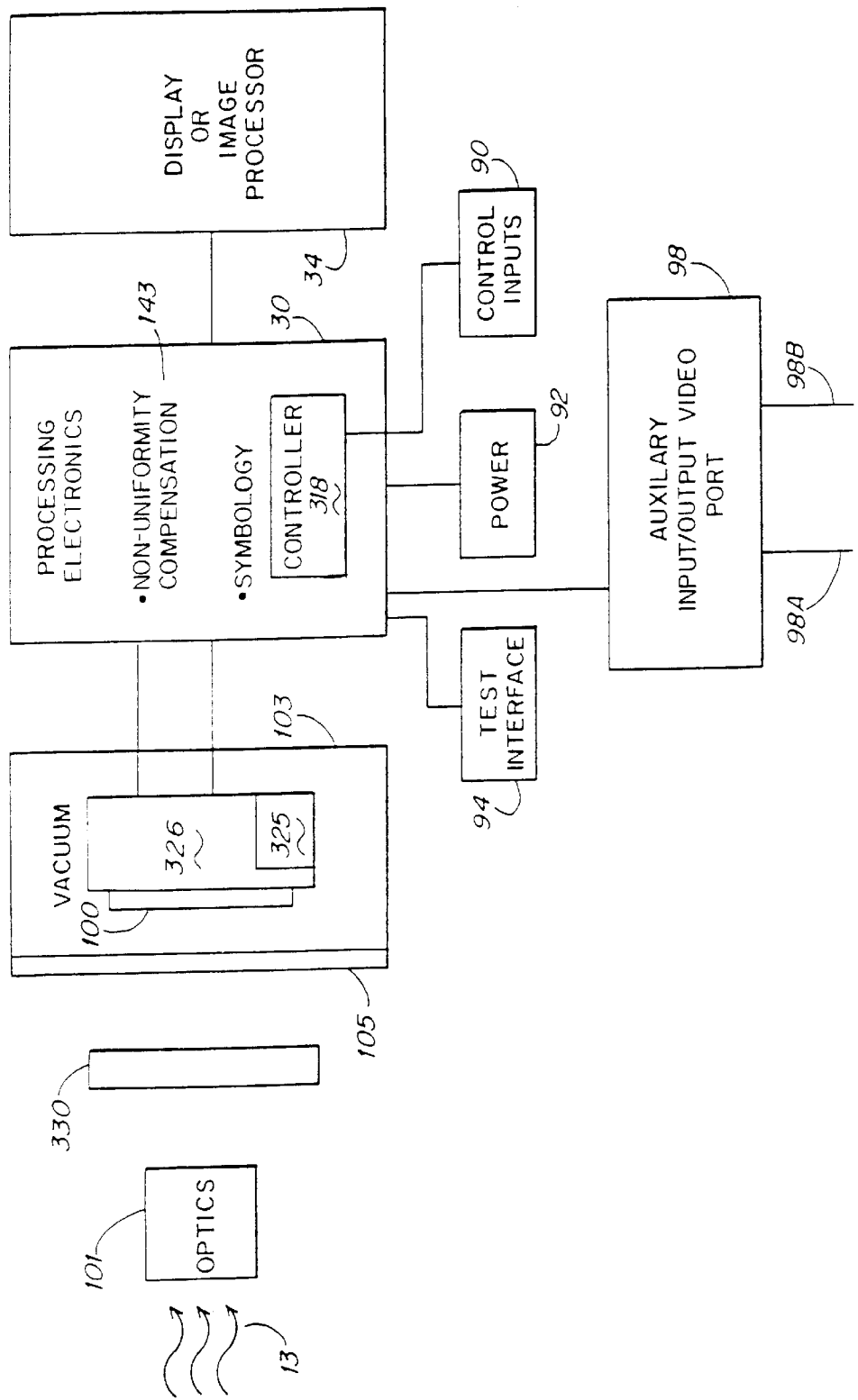
FIG. 1A shows a schematic block diagram of one embodiment of the uncooled focal plane array sensor of the invention.

FIG. 1A shows a schematic block diagram of one embodiment of the uncooled focal plane array sensor of the invention. A focal plane array. FPA 100, is contained in a sealed vacuum package 103 with an infrared transmissive window 105. The focal plane array, FPA 100, may advantageously comprise a two dimensional focal plane array comprised of a plurality of microbolometers constructed on an integrated circuit. Radiation 13 from a scene is focused onto the FPA 100 through window 105 with optics 101. FPA 100 receives the radiation which forms an image on the focal plane array, and the microbolometer elements comprising FPA 100 responsively produce a plurality of electronic image signals representative of the image. The two dimensional microbolometer array FPA 100 converts the radiation to electronic signals that are read out and digitized by analog-to-digital circuitry integrally constructed on an integrated circuit chip, where the integrated circuit chip also comprises the FPA 100. In this way, digital image data is provided from the sealed vacuum package 103 to the processing electronics 30. Details of the integrated circuitry and processes are discussed in more detail below. As described further herein, the FPA 100 temperature is advantageously stabilized during operation.

Signal processing electronics 30 may be advantageously located externally to the sealed vacuum package 103 and are connected to compensate the image formed on the FPA 100 and reformat the digital image data. The digital image data may be displayed, for example, on a television monitor or equivalent display.

Digital image data is sent to processing electronics 30 for nonuniformity compensation. A non-uniformity compensation circuit 143 comprises level adjustment, gain correction, bad pixel removal, brightness and contrast adjustment. One embodiment of gain correction is described in co-pending U.S. patent application Ser. No. 08/521.266, to Butler, filed Aug. 30, 1995, entitled "Bolometric Focal Plane Array." assigned to the same assignee as the present invention which is incorporated herein by reference. In one embodiment of the invention, offset correction circuitry may also be integrated onto the FPA chip as described below with reference to FIG. 4. After processing, the data is reformatted and sent to a display processor 34.

To control the imager a control panel 90 may be provided. The control panel 90 provides a means for the user to adjust brightness, contrast, symbology, on/off and other functions necessary to control the operation of the imaging system of the invention.

The system receives power from power source 92. In one example, the power source 92 may comprise batteries mounted internally in a suitable housing with the sensor package, or a suitable external power supply or equivalent power source. Auxiliary ports 98 are provided for control signals and video signals. A first auxiliary Input video port 98A may be connected to an external source to allow the invention to display other images from any such external source. A second auxiliary video output port 98B provides a means to view or record what imagery is being collected and displayed by the invention. A test interface 94 may be included to provide access for diagnostics, initial testing and/or calibration of the invention.

In one embodiment of the invention optics 101 may advantageously be refractive optics for wide field of view applications, or may be reflective optics for narrow field of view applications. The optics 101 may be selected according to conventional design techniques to operate from the visible spectrum to the infrared spectrum. The FPA 100 is housed in a vacuum package 103 that contains a thermoelectric stabilizer 326 and temperature sensing element 325. In one example embodiment the temperature sensing element 325 may be integrated onto a semiconductor chip with the FPA or may even comprise the FPA itself. The cover of the package 103 comprises a window 105 having an anti-reflection coating.

The switches in the control panel 90 provide inputs to the microprocessor microcontroller 318. The microprocessor microcontroller 318 interprets the switch positions on the control panel 90 and issues the appropriate command signals. The microprocessor provides programmability. In one embodiment of the invention a cathode ray tube (CRT) or flat panel display may be used.

Figure 1B:
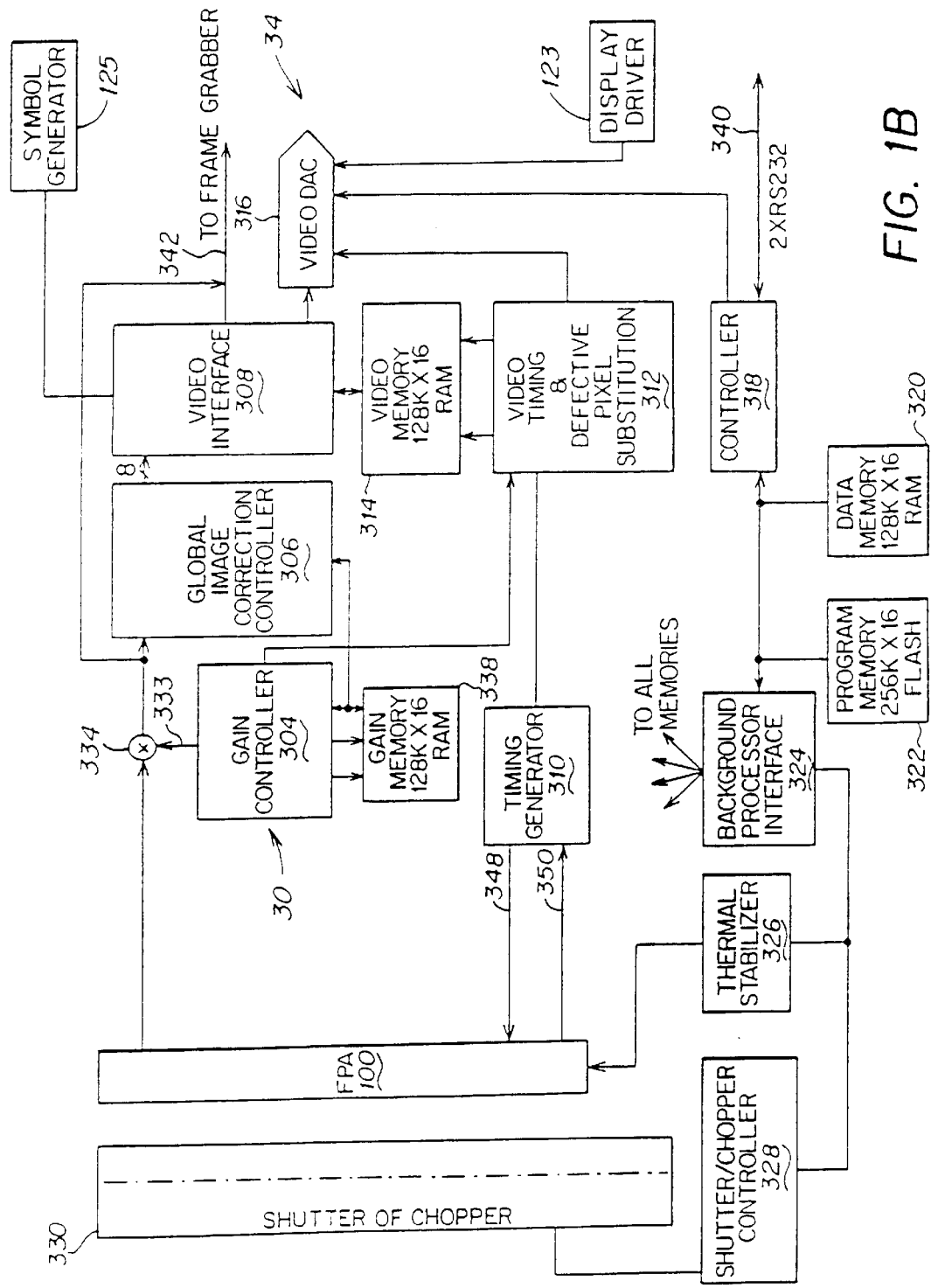
FIG. 1B shows a schematic block diagram of the focal plane array apparatus as employed in one embodiment of the invention.

FIG. 1B shows a schematic block diagram of a system employing the focal plane array and integrated signal processor of the invention. The digital offset correction apparatus comprises a shutter/chopper controller 328 coupled to control shutter 330. It will be appreciated that, depending upon the particular application, a germanium or opaque chopper or other equivalent optical device may be substituted for the shutter 330. The shutter 330 controls radiant energy entering the system. When the shutter is open, radiant energy impinges upon focal plane array (FPA) 100. The chopper 330 may be synchronized with the FPA frame rate. FPA 100 may advantageously be comprised of an integrated microbolometer focal plane array with associated control electronics. The integrated microbolometer focal plane array may be further comprised of pixel elements wherein each pixel element provides a signal representative of an amount of radiant energy absorbed by the pixel element. The FPA 100 may be operated in a shutterless or vidicon mode where the FPA 100 is not blocked by an obstruction. In the vidicon mode, images may be obtained continuously.

A timing generator 310 provides two timing signals 348 and receives two clock signals 350 from the focal plane array 100. Timing generator 310 generates the FPA 100 clocks, the system clocks, and required timing signals. Timing generator 310 also provides timing signals to a video timing and defective pixel substitution controller 312. A gain controller 304 provides a gain adjust signal 333. Global image correction controller 306 provides an 8-bit signal to a video interface 308.

A video generator 316 is provided with video timing and the output of a controller 318. The video generator 316 may advantageously comprise a digital-to-analog converter as is known in the art. The controller 318 may advantageously comprise a microprocessor, such as, for example, a commercially available model 8OC186EC type microprocessor or equivalent. A background processor interface 324 is provided with a program memory 322 and a data memory 320. In one embodiment of the invention, the program memory 322 may comprise a 256K×16 flash memory and the data memory 320 may comprise a 128K×16 RAM. The controller 318 may advantageously be connected through the background processor interface 324 to write or read data from each memory including the gain memory 338 and the video memory 314. Serial communications line 340 may be coupled to provide an external interface for the controller 318. Video output data is available from the video digital-to-analog converter (DAC) 316, frame data is available to an external frame grabber on line 342. Symbology information such as alpha/numeric information is also incorporated into the video stream by symbol generator 125. Display driver electronics 123 converts the electronic signals into a visible image. A useful display driver may advantageously comprise, for example, an RS 170 standard driver.

The controller 318 interfaces the imaging system to external systems through a host microcomputer. The controller 318 also generates histograms, generates brightness and equalization curves, controls the chopper or shutter, generates reference image frame timing, performs memory and system diagnostics, monitors manual controls and switches, and controls the TE stabilizer 326.

Figure 2:
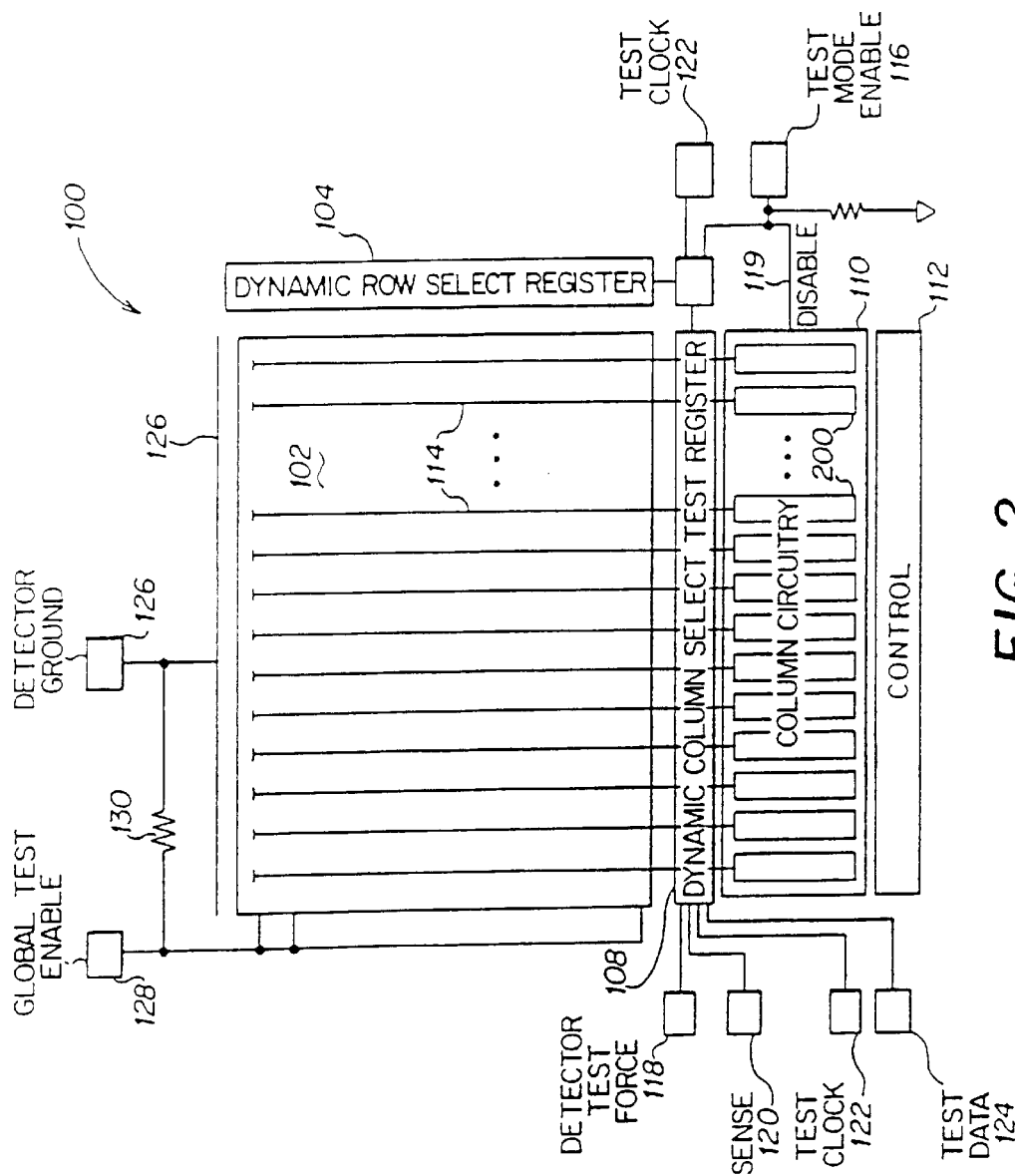
FIG. 2 shows a schematic diagram of a detector array of one embodiment of the invention.

FIG. 2 shows a schematic diagram of the array sensor of the invention. A microbolometer array 102 comprises the radiation sensing portion of the focal plane array 100. In one embodiment, the array 102 may comprise over 80,000 individual microbolometers. The electronic circuits associated with each microbolometer are shown in more detail in FIG. 3A. The detector ground 126 is distributed uniformly over the array 102. The array is arranged in a regular grid of microbolometers, by column line 114, addressed individually using a dynamic row select register 104 and column circuitry 110. The array 102 and the array's electronics may be tested during array production. The test clock 122, test data 124, test mode enable 116, global test enable 128 and detector test force 118 signals provide the control signals used to test the array. Column processing circuitry 200 is provided for each column line 114 in the array. The column circuity 110 is shown in more detail hereinbelow.

The array 102 is addressed using a dynamic row select register 104 and a dynamic column select test register 108. In operation, column circuitry 110 addresses any particular column. Control 112 controls the operation of the column circuitry. As can be appreciated by those skilled in the art, the microbolometer elements may be swept with a short duration bias current to produce output signals from particular row and column addresses as selected by row and column select lines.

Figure 3A:
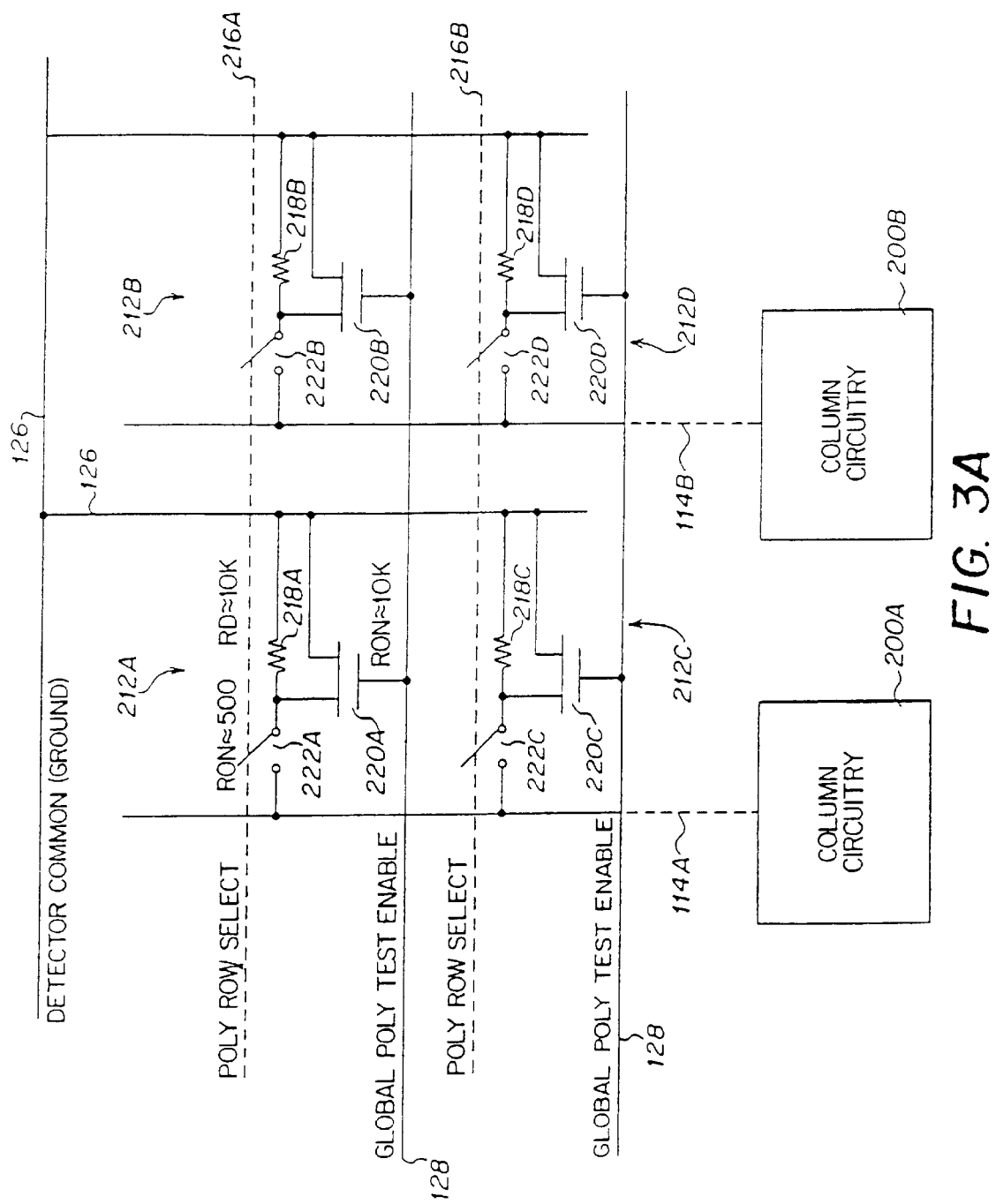
FIG. 3A is a circuit schematic diagram of one portion of a microbolometer array of the invention showing four example detectors and detector electronics.

FIG. 3A is a circuit schematic diagram of one portion of the microbolometer array of the invention showing an example of four detectors and associated detector electronics. The microbolometer array comprises a plurality of basic unit cells including multiplexer test transistors. In one embodiment the microbolometer focal plane array may comprise a 328×246 matrix of unit cells having 328 column circuits. The detector common ground 126 is connected to one side of bolometers 218A, 218B, 218C and 218D and unit cells 212A, 212B, 212C and 212D, respectively. The bolometers are connected in parallel with test transistors 220A, 220B, 220C and 220D. The "on" resistance of transistors 220A, 220B, 220C and 220D approximates that of the bolometers 218A, 218B, 218C and 218D. Thus, the test transistors can be used to provide a signal that emulates the bolometer signal. The emulated signal may be used to test the multiplexer circuitry before the bolometers are created. Such testing may advantageously result in less expensive manufacture because defective chips may be thus identified prior to final fabrication. Switches 222A, 222B, 222C and 222D switch the bolometer or test transistor signal in response to row select lines 216A and 216B. In a test mode the test transistors may be activated by the global test enable 128 and each individual row may be selected using one of the row select lines. An output 114A and 114B is available at each column circuit 200A and 200B. In a test mode, the column circuitry, 200A and 200B is bypassed and addressed with a column multiplexer.

Figure 3B:
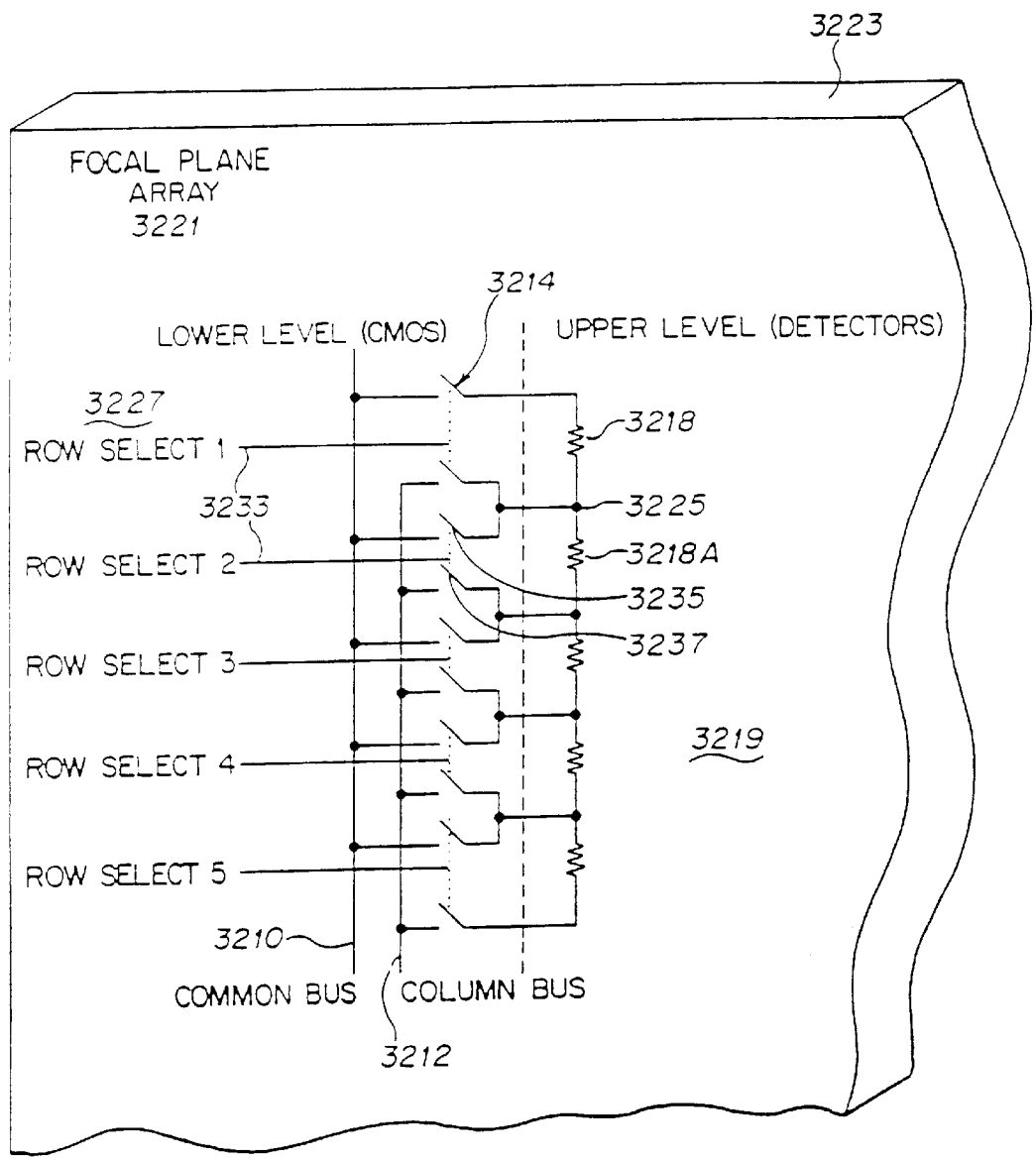
FIG. 3B is a circuit schematic diagram of an alternate embodiment of a portion of a microbolometer array of the invention showing a plurality of detectors and detector electronics.

Refer now to FIG. 3B where a circuit schematic diagram of an alternate embodiment of a portion of a microbolometer array of the invention conceptually showing a plurality of detectors 3218 and detector electronics is shown. Each of the plurality of detectors 3218 may advantageously be constructed on an upper level 3219 of a microbolometer focal plane array 3221 comprising an integrated circuit fabricated on a semiconductor chip 3223. A series of switches 3214 are constructed on a second level 3227 of the semiconductor chip 3223. The switches 3214 may advantageously comprise CMOS switches. The switches 3214 are connected to be activated in pairs where the switches are connected at a first terminal to a common bus 3210 and at a second terminal 3225, to one end of a detector. Row select lines 3233 operate to activate a pair of switches to select one of the detectors. The selected detector's output may then be sensed on a column bus 3212. For example, in operation, row select 2 responds to a control signal to activate a switch pair comprising switch 3235 and switch 3237, thereby allowing a signal from detector 3218A to be transmitted to the column bus 3212. Note that in this configuration the number of connections required to connect the column of detectors to the switching level may be advantageously reduced to one more than the number of detectors.

The unique construction of the uncooled focal plane array sensor of the invention provides high thermal isolation between detectors which results in high contrast images. The uncooled focal plane array also provides high contrast images in comparison with other thermal imagers. These high contrast images allow the user to see more detail, producing sharper images.

Figure 4:
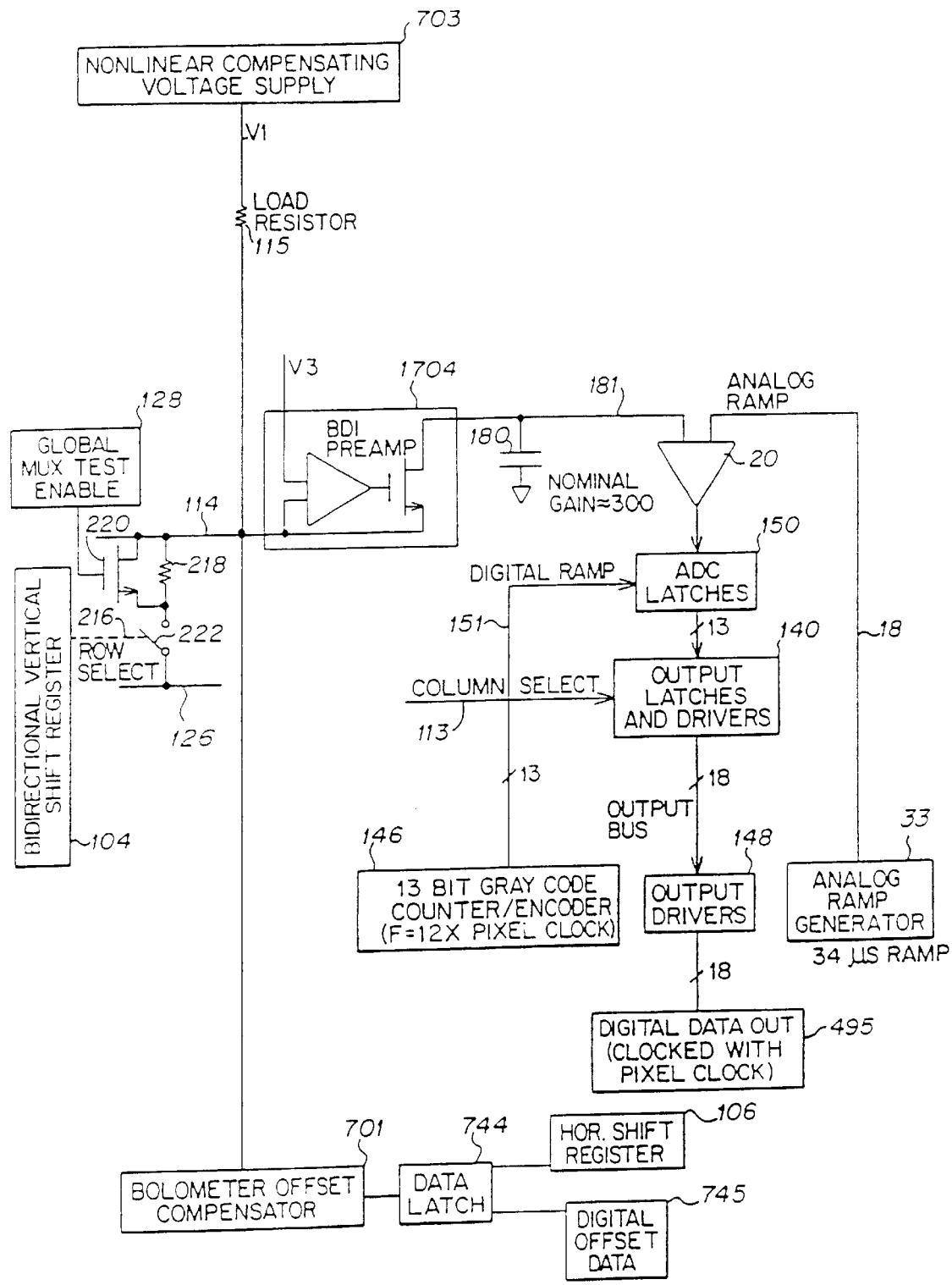
FIG. 4 shows a circuit schematic diagram of a microbolometer focal plane array processing circuitry of the invention.

Refer now to FIG. 4 which shows one example of microbolometer array processing circuitry employed by the invention. The processing circuitry may advantageously be integrated onto a single integrated circuit with the focal plane array using, for example, MOS technology. A bidirectional vertical shift register 104 functions as the row select for the array. Row select line 216 activates switch 222 to either select the signal from the bolometer 218 or the test transistor 220. A global test enable 128 activates all test transistors when engaged. The column line 114 is biased by a supply 703. The column line 114 is sensed by a buffered direct injection (BDI) circuit 1704 having a preamplifier stage and an output transistor stage. The integration capacitor I 80 integrates the signal on the column sense line 181. In one embodiment of the invention the integration capacitor 180 may have an integration time of about 29 microseconds. Comparator 20 compares an analog ramp signal 18 to the integrated signal on column sense line 181.

The ramp generator 33, shown in more detail below, provides the comparator with an analog ramp signal 18. The ramp signal, in one example, may be a 34 us ramp that may nominally range between about 5 volts to 10 volts. The comparator 20 provides a binary-signal to the analog-to-digital latches 150. A digital ramp signal 151 is provided from a 13 bit gray code counter/encoder 146. The 13 bit gray code counter/encoder 146 may operate using a frequency equal to 12 times the pixel clock, using four phases of the 12x-clock for 13 bit resolution. The digital ramp signal and the analog ramp signal are coordinated so that they start and end at the same time.

A column select line 113 provides the addressing for the output latches and drivers 140. Depending on the column selected, the output latches and drivers provide the count of the analog-to-digital converter latches 150, enabled by comparator 20. The output drivers 148 provide digital data 495 to the off focal plane circuits. The digital data 495 may be clocked with the pixel clock.

In the example embodiment, a bolometer offset compensator 701 is connected in parallel with the detector elements. It will be understood that the bolometer offset compensator and its control circuits are replicated for each column of detectors in the array. The embodiment shown in FIG. 4 optionally includes a nonlinear compensating voltage supply 703 coupled to load resistor 15. The load resistor 115 is connected to the bolometer offset compensator 701. One embodiment of the bolometer offset compensator 701 is described in more detail below with reference to FIG. 8. The bolometer offset compensator 701 is coupled at a first terminal to load resistor 115 and-at a control input to data latch 744. The data latch 744 is described in more detail below with reference to FIG. 9. Digital offset data 745 is provided to the data latch 744. The digital offset data represents the offset to be applied to each row and column bolometer signal on column line 114. A BDI preamplifier 1704 amplifies the offset bolometer signal for further processing.

Figure 5:
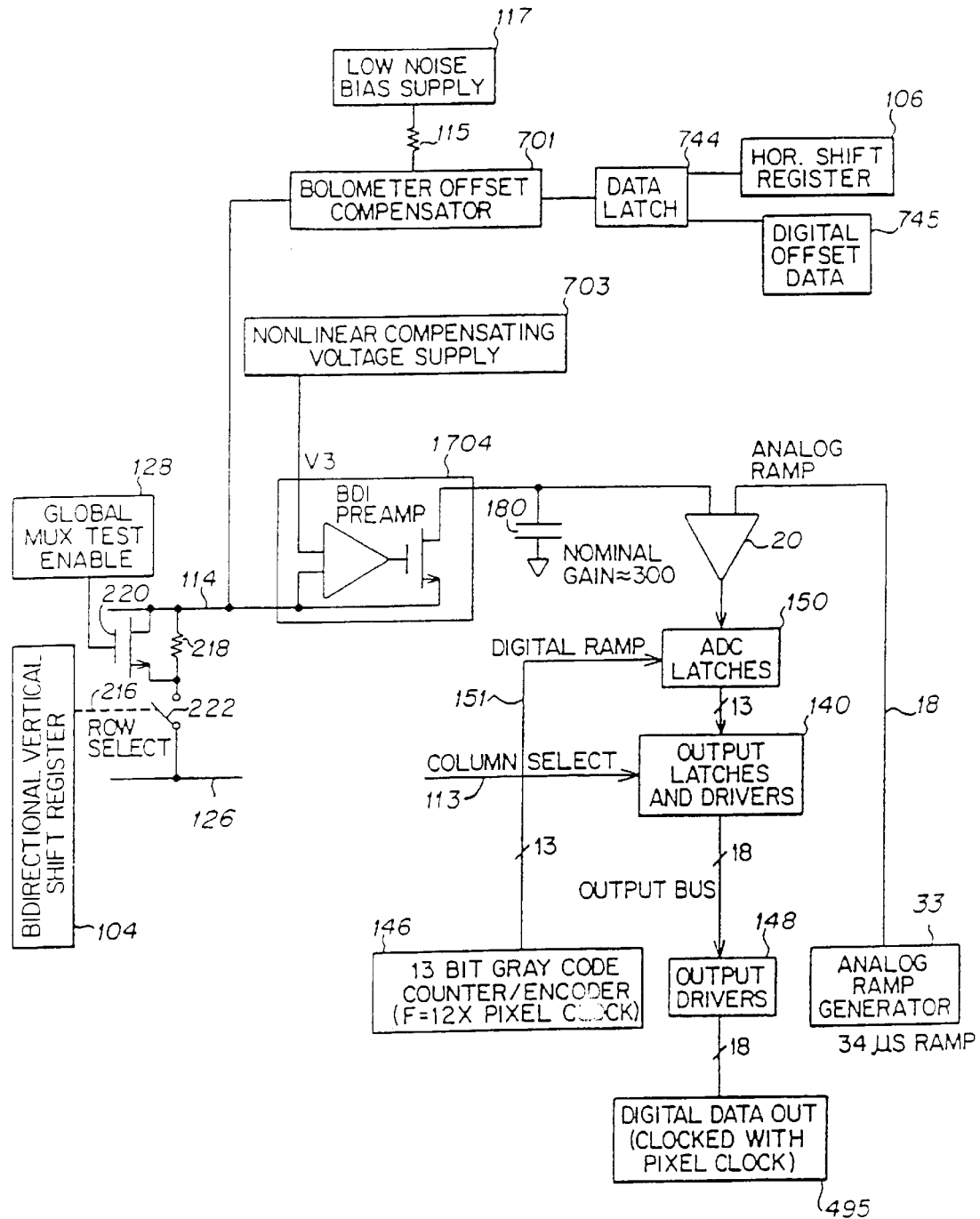
FIGS. 5 and 6 show alternate examples of microbolometer focal plane array processing circuitry embodied, for example in an integrated circuit, of the invention employing a bolometer offset compensator.

Refer now to FIG. 5 which shows another alternate example of microbolometer array compensation circuitry of the invention employing a bolometer offset compensator 701 connected in series with the load resistor 115, and the detector elements. Supplying a voltage bias to the bolometer offset compensator 701 is a low noise bias supply 117. It will be understood that the bolometer offset compensator and its control circuits are replicated for each column of detectors in the array. The alternate embodiment shown in FIG. 5 optionally may include a nonlinear compensating voltage supply 703 coupled to one input of a BDI preamplifier 1704. The other elements are connected in a manner similar to that described above.

Figure 6:
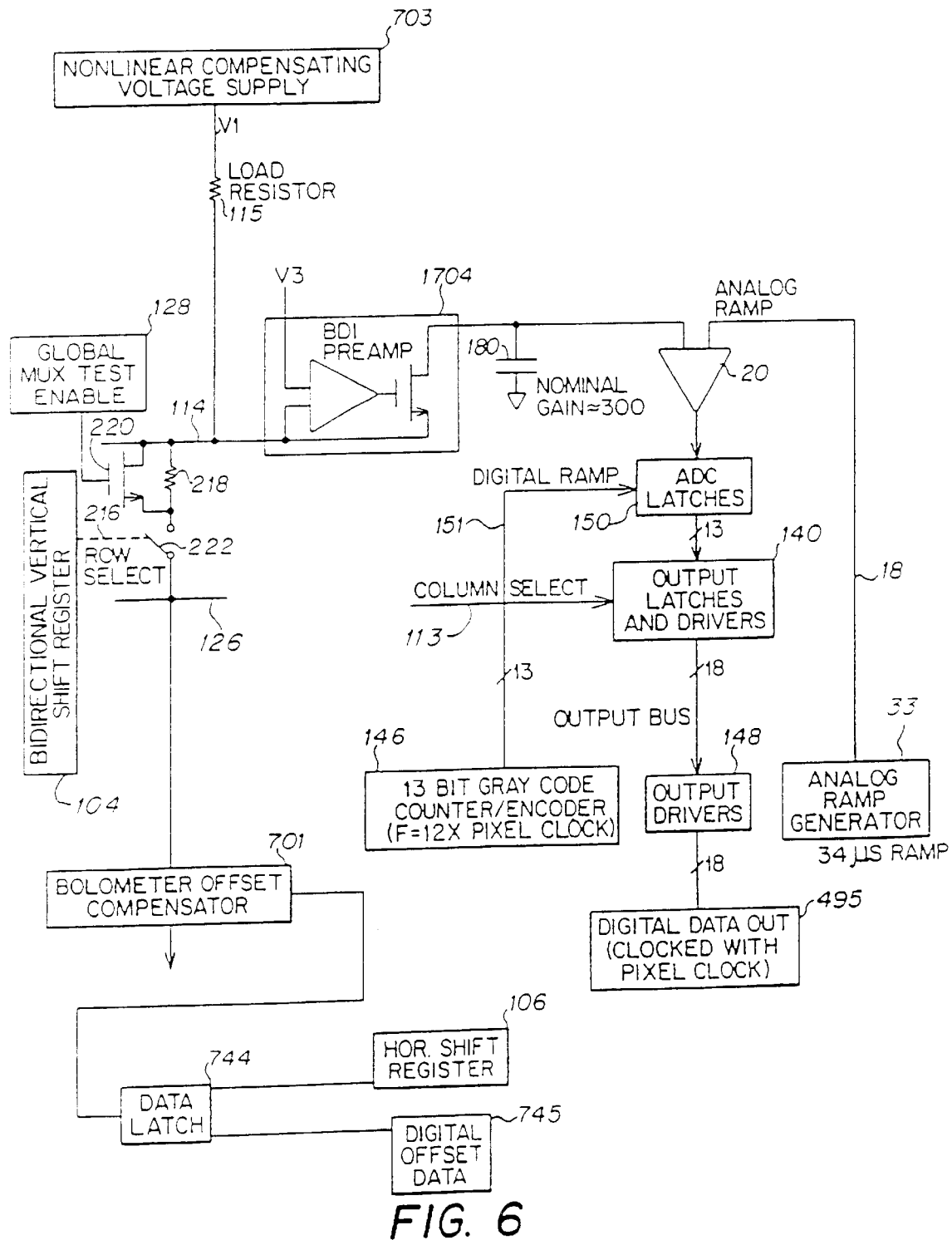

Refer now to FIG. 6 which shows another alternate example of microbolometer array compensation circuitry of the invention employing a nonlinear compensating voltage supply 703 coupled to load resistor 115. The other elements are connected in a manner similar to that described above with respect to FIG. 4. The operation of the nonlinear compensating voltage supply is—explained in more detail hereinbelow.

Figure 7:
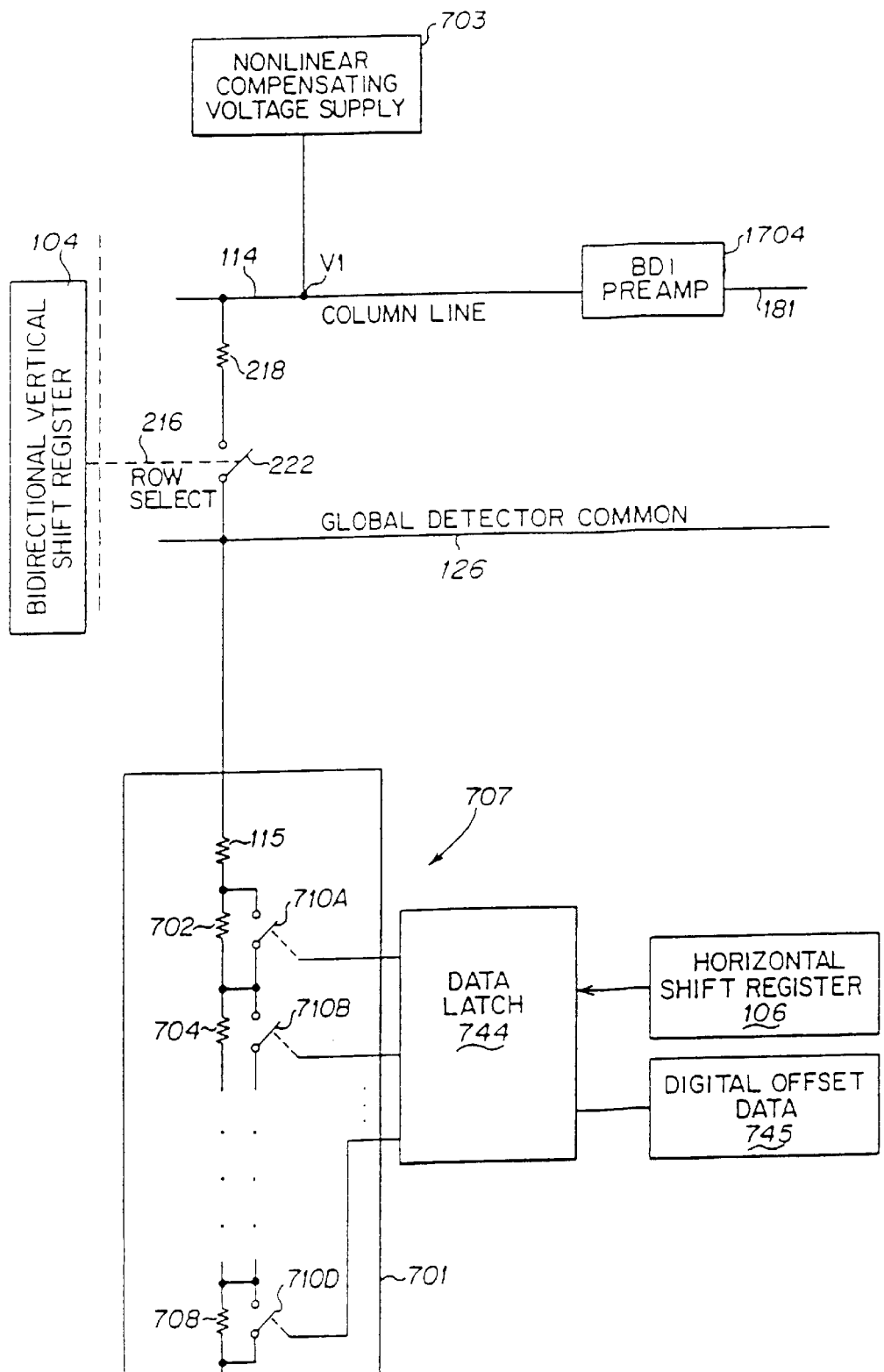
FIG. 7 shows an alternate embodiment of a bolometer offset compensator circuit as contemplated by an alternate embodiment of the invention.

Now refer to FIG. 7 which shows an alternate embodiment of a bolometer offset compensator circuit as contemplated by the present invention. As described above each column of the focal plane array is coupled to a bolometer offset compensator 701. Thus the bolometer offset compensator 701 and associated circuits, designated by arrow 707, are replicated on the FPA integrated circuit chip for each of M columns, where M represents the number of column circuits. The bolometer signal on column line 114 is selected with row select line 216 to connect to BDI preamplifier 1704. The signal from the bolometer on column line 114 is the signal being compensated by the bolometer offset compensator 701. In the example shown, the bolometer offset compensator 701 comprises first through sixth compensating resistors, some of which are shown for illustrative purposes as compensating resistors 702, 704, and 708, each individually coupled to a plurality of switches 710A, 710B and 710D. The plurality of switches are coupled and controlled by the outputs of, for example, a six bit data latch 744. The six bit data latch 744 is enabled by the horizontal shift register 106. Digital offset data 745 selects the particular resistor combination through data latch, 744. In one embodiment of the invention, the first through sixth compensating resistors may have values in the nominal range of 1200 ohms to 8200 ohms and are coupled to a load resistor 115 of about 145 kohms, for example. The embodiments shown herein are meant by way of illustration, not limitation, and other equivalent values and combinations of compensating resistances or equivalent circuitry may be used without departing from the spirit and scope of the invention. In one embodiment nonlinear compensating voltage supply 703 supplies voltage to the bolometer offset compensator 701.

Figure 8:
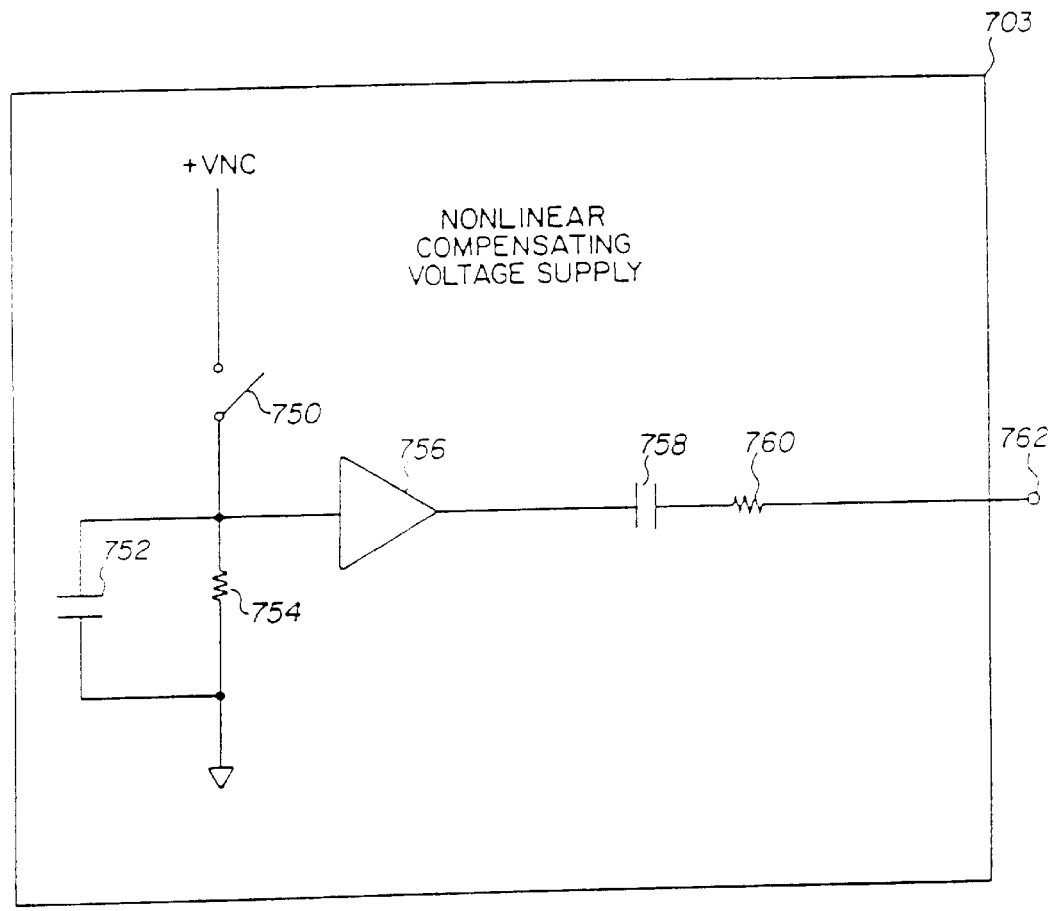
FIG. 8 schematically shows one example of a nonlinear compensating voltage supply as contemplated by an alternate embodiment of the invention.

Now refer to FIG. 8 which schematically shows one example of a nonlinear compensating voltage supply 703 as contemplated by an alternate embodiment of the invention. The nonlinear compensating voltage supply comprises a switch 750 connected to a capacitor 752 that is connected in parallel with resistance 754. When closed, switch 750 applies a voltage, VNC, to amplifier 756. Amplifier 756 may advantageously comprise a unity gain amplifier having an output 762 through an output capacitor 758 connected in series to an output resistance 760. Referring again to FIG. 4, the output 762 may be connected to node V1 or, in an alternate embodiment, to node V3 so as to control the BDI preamplifier. The switch 750 may advantageously be activated synchronously with the detector row select. As will be appreciated by those skilled in the art having the benefit of this disclosure, the amplifier 756 may comprise a unity gain inverting operational amplifier or a unity gain non-inverting operational amplifier depending upon the integrated circuit technology.

Figure 9:
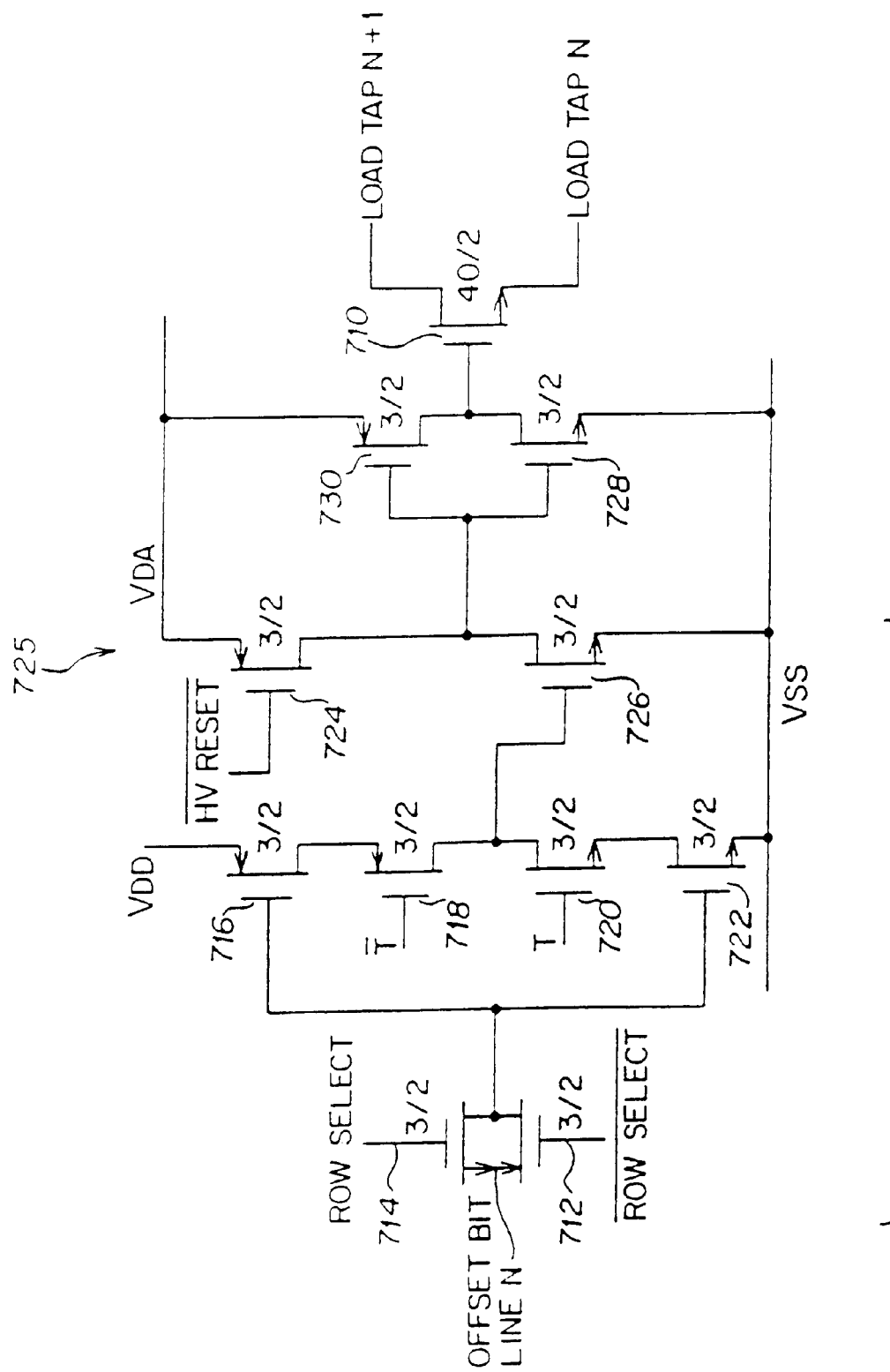
FIG. 9 shows an example of a one bit latch used in a six bit data latch as employed in an alternate embodiment of the invention.

Refer now to FIG. 9 which shows an example of a one bit latch 744A used in the six bit data latch 744. Bit latch 744A may be coupled to a level shifter circuit 725 for changing the voltage level from the input to the output. The level shifter 725 may be advantageously configured to decrease n-channel on resistance. The circuit of FIG. 9 may advantageously be duplicated a plurality of times for each compensating resistor. In one example where the bolometer offset compensator 701 employs six compensating resistors, identical data latch circuitry may advantageously be fabricated six times for each of the M columns on the FPA chip. In a preferred embodiment, the data latch 744 comprises complementary metal oxide semiconductor (CMOS) transistors.

At the input, each bit latch 744A comprises row select transistors 714. 712 configured to dynamically latch and select the Nth offset bit. Transistor 714 is controlled by a row select output from the horizontal shift register 106. Transistor 716 is controlled by a NOT row select output from the horizontal shift register 106. Transistors 716, 722 operate as a second dynamic latch. Transistors 718 and 720 drive transistor 726 in response to control signals T and NOT T which transfer the state of the n offset bit to transistor 726 when activated. The NOT HV reset signal resets the output of transistor 726 via 724 while the transfer signals T and NOT T are inactive. After reset the transfer signals active and transistors 718 and 720 drive transistor 726. Transistors 728 and 730 act to drive transistor 710 in response to the output of transistor 726. At the output, a switching transistor 710 controls selection of a compensating resistor by shorting Load tap N to Load tap N+1. The plurality of switches 710A–710D comprise switching transistor 710 in the example above. The first latch may be biased at a first voltage Vdd for operating transistors in the range of 3×2 microns in area, while a second voltage Vda, substantially higher than Vdd, may be selected to operate transistor 710. Transistor 710 may comprise semiconductor material having an area of about 40 by 2 microns.

Having described the elements of the bolometer offset compensator circuitry it will be helpful to the understanding of the invention to now describe the operation of the bolometer offset compensator circuitry. By way of further background, microbolometer focal plane arrays typically require electronic circuits with a very large dynamic range in order to simultaneously accommodate both detector non-uniformities and very low signal levels. A dynamic range in excess of 1 million to 1 is typical. Electronic circuit switches can meet this requirement, especially when applicable to large focal plane arrays, and provide a significant benefit and a practical application of microbolometer technology. In the embodiment shown in FIG. 7, the nonlinear compensating voltage supply, when employed, may preferably be an off-focal plane nonlinear compensating voltage supply connected to on focal plane circuits comprising the bolometer detectors, load resistor pre-amplifier and compensating resistors. When a voltage, VI, is applied, a current flows through the detector column line 114, load resistor 115 and at least one compensating resistor as selected by opening one or more of the plurality of switches 710A–710D. In some embodiments, load resistor 115 may not be required. Voltage V1 is set by a BDI preamplifier 1704 and is nominally the same voltage for each of M detector circuits. The current which flows into the preamplifier represents the signal current. To compensate for differences in detector resistance where the detector resistance may vary significantly from detector to detector the compensating resistors may be employed. If such compensating resistors are not employed, the preamplifier circuit must have a significantly increased dynamic range in order to accommodate not only the useful signal current, but also significant additional current resulting from, detector resistance variations.

As current is applied to the bolometer detectors, I2 R heating (that is, heating in proportion to the square of the current through the resistance) raises the temperature of each detector. The increased temperature results in a change in detector resistance, thereby increasing the input dynamic range requirement of the BDI preamplifier 1704. The external nonlinear compensating voltage supply 703 senses the current change at node Vi, and provides a nonlinear voltage precisely compensating for I2 R heating induced changes in preamplifier current. In this way, the nonlinear voltage also reduces the dynamic range requirement of the preamplifier circuit to a level that may be readily achieved in an electronic circuit integrated onto the focal plane.

Figure 10:
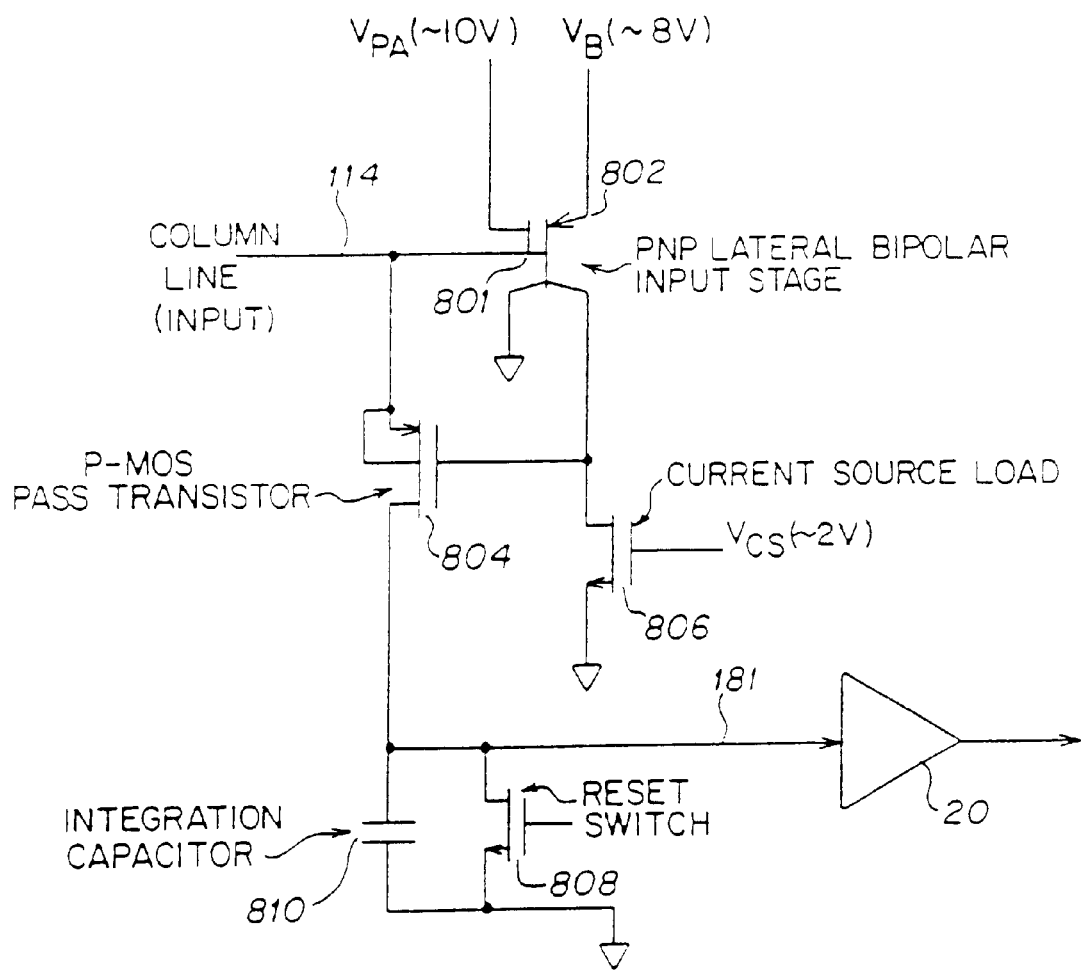
FIG. 10 shows an example of a buffered direct injection (BDI) preamplifier employing lateral bipolar transistors.

Referring now to FIG. 10, there shown is an example of a BDI preamplifier employing lateral bipolar transistors. The BDI preamplifier comprises, for example, a PNP lateral bipolar input stage 802, a current source load 806, a P-MOS pass transistor 804, an integration capacitor 810 and a reset switch 808. The column line 114 may be connected to the PNP lateral bipolar input stage at a gate 801. The gate 801 may also be coupled to a suitable voltage, VPA, where VPA may be about 10 volts. An emitter of the input stage 802 may be coupled to a second voltage, VB, of about 8 volts. The current source load 806 may be coupled to a collector of the input stage 802. The column sense line 181 may then be coupled to the integration capacitor 810 where the integration capacitor 810 may be reset by reset switch 808. Reset switch 808 may also be implemented as a lateral bipolar transistor. Lateral bipolar transistors are discussed in more detail in an article by Holman and Connelly entitled "A Compact Low Noise operational Amplifier for a 1.2 μm Digital CMOS Technology." IEEE Journal of Solid State Circuits. Vol. 30. No. 6. June 1995.

Figure 11:
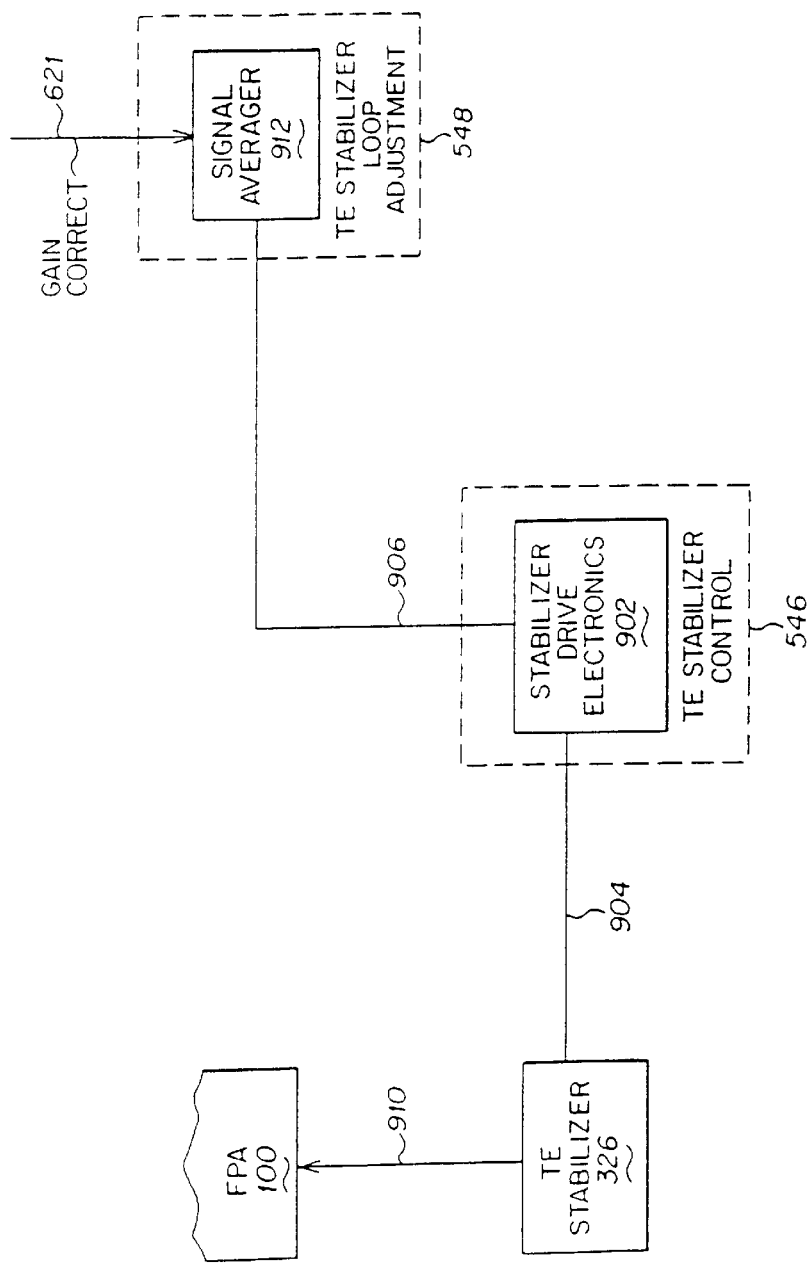
FIG. 11 is a schematically shows a block diagram of one example of a thermal stabilization apparatus for a microbolometer focal plane array as embodied in accordance with the present invention.

Now referring to FIG. 11, there shown is a block diagram of one particular example of a thermal stabilization apparatus for a microbolometer focal plane array as embodied in accordance with the present invention. The apparatus comprises the microbolometer focal plane array 100 for providing temperature data from each of a plurality of microbolometers. As described above, the data from FPA 100 may be processed to produce a gain corrected signal 621 from the gain/image correction controller 304. The TE stabilizer loop adjustment 548 may comprise a means for determining an average signal 912 coupled to the gain corrected signal from the gain/image correction controller 304. The means for determining an average signal 912 comprises a feedback signal output 906. An average signal representative of the average temperature of the array of microbolometers, is determined from the gain corrected signal so as to generate a feedback signal on the feedback signal output 906. The feedback signal may advantageously be proportional to the average signal. The TE stabilizer control 546 may comprise a means for generating a temperature control signal 902 including an input for accepting the feedback signal output 906. The temperature control signal means 902 includes a temperature control output 904 for carrying a temperature control signal proportional to the feedback signal. A thermal stabilizer 326 is in contact with the microbolometer focal plane array. The thermal stabilizer 326 has an input coupled to the temperature control output and responds to the temperature control signal to adjust the average temperature of the microbolometer focal plane array 100 as indicated by coupling 910.

In one embodiment of the apparatus of the invention the thermal electric stabilizer 326 may advantageously comprise a thermoelectric cooler. The means for determining an average signal 912 may advantageously comprise a microprocessor or be executed as a computer program carried out in the controller 318. The temperature control signal generating means 902 may comprise a conventional power amplifier.

In useful embodiments of the apparatus of the invention the average signal determining means may be coupled to receive data from each microbolometer in the FPA or from a selected portion of microbolometers in the array. In this way, the method and apparatus of the invention, for the first time exploits the temperature sensitivity of the FPA bolometer elements to stabilize the array itself at the average temperature of the bolometer elements in the array.

In operation, the method of the invention provides a computer controlled method for thermal stabilization of a microbolometer focal plane array wherein each process step is implemented in response to a computer generated command. The computer controlled method comprises the steps of:

A. reading out temperature data from each of a plurality of microbolometers in the microbolometer focal plane array;

B. determining an average signal from the temperature data;

C. generating a feedback signal where the feedback signal is proportional to the average signal;

D. generating a temperature control signal proportional to the feedback signal; and E. stabilizing the temperature of the microbolometer focal plane array by adjusting the average temperature of the microbolometer focal plane array in response to the temperature control signal.

In one embodiment, the step of stabilizing the temperature comprises the step of adjusting the temperature of a thermal electric stabilizer coupled to the microbolometer focal plane array.

In one alternate embodiment of the invention using a separate temperature sensor on the array substrate, the TE stabilizer may keep the FPA temperature stable to within 100 microdegrees kelvin for the following parameters sensor resistance: $5K\Omega \leq R \leq 20K\Omega$, and temperature coeff: $-2\%/$deg. Kelvin.

A separate temperature sensor circuit may be implemented by placing the sensor into one leg of a differential bridge. The two power leads to the bridge may be automatically switched so that differential measurements may be taken with the bridge powered both ways to cancel out any drift in a dc driving source. The bridge resistors have a value R, equal to the resistance of the sensor. To obtain an absolute temperature accurate to within 1 degree kelvin, for the temperature coefficient of $-2\%/$deg. K, the value of R must be accurate to within 2%. For the given range of sensor resistance, there may exist N total different values for the bridge $1.02N=(20K/5K)$, $N=\log(4)/\log(1.02)$, and $N=70$.

Thus, each sensor must be measured to select the appropriate resistors for assembly. The voltage difference across the bridge for a driving voltage of 12 volts will be approximately 6 $\mu v$ for a 100 $\mu$deg. change in temperature. This voltage will then be amplified by approximately 100,000 and sampled by an analog-to-digital converter for input to the background processor. The processor may be used to control the power drive circuits for the TE stabilizer.

For purposes of illustration only, and not to limit generality, the present invention will now be explained with reference to particular embodiments and operational parameters. One skilled in the art will appreciate, however, that the present invention is not limited to the particular operational parameters described.

Figure 12:
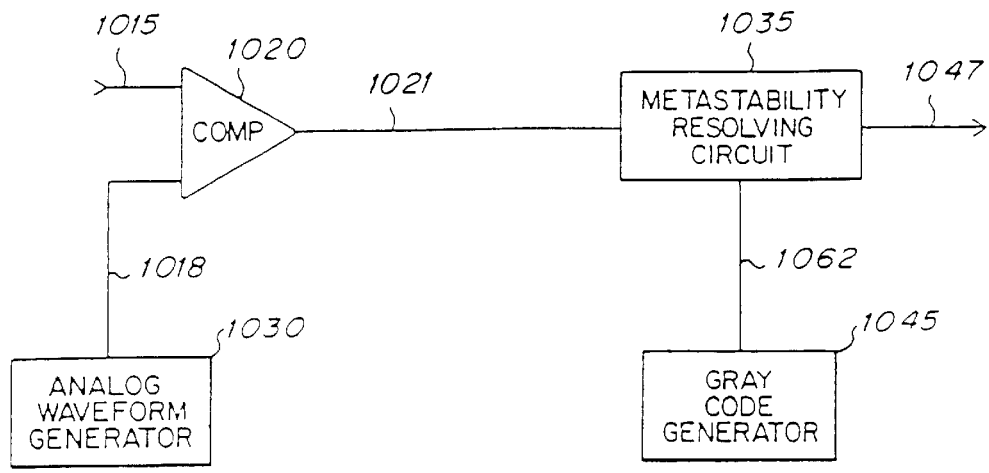
FIG. 12 is a schematic block diagram of an analog-to-digital converter according to the invention.

Reference is now made to FIG. 12, which is an overall schematic block diagram of the analog-to-digital converter of the invention. Analog input signal 1015, the analog signal to be converted, is connected to one input of an unclocked analog comparator 1020. The other input of the comparator 1020 is connected to an analog ramp signal 1018. Analog waveform generator 1030 generates the analog ramp signal 1018. When the analog ramp signal 1018 substantially equals the analog input signal 1015, the comparator generates output signal 1021. The comparator output signal 1021 is connected to a control input of a metastability resolving circuit 1035. Synchronized with the analog waveform generator 1030 is a Gray code generator 1045 that generates a digital Gray code on a digital Gray code bus 1062. The digital Gray code bus 1062 is connected to a data input of the metastability resolving circuit 1035. The metastability resolving circuit 1035 stores the states of the digital Gray code on bus 1062 in response to an active state of the comparator output signal 1021. As a result, the digital output signal 1047 of the metastability resolving circuit 1035 is a digital representation of the magnitude of the analog input signal 1015 when the magnitude of the analog ramp signal 1018 equals the magnitude of the analog input signal 1015.

Figure 13:
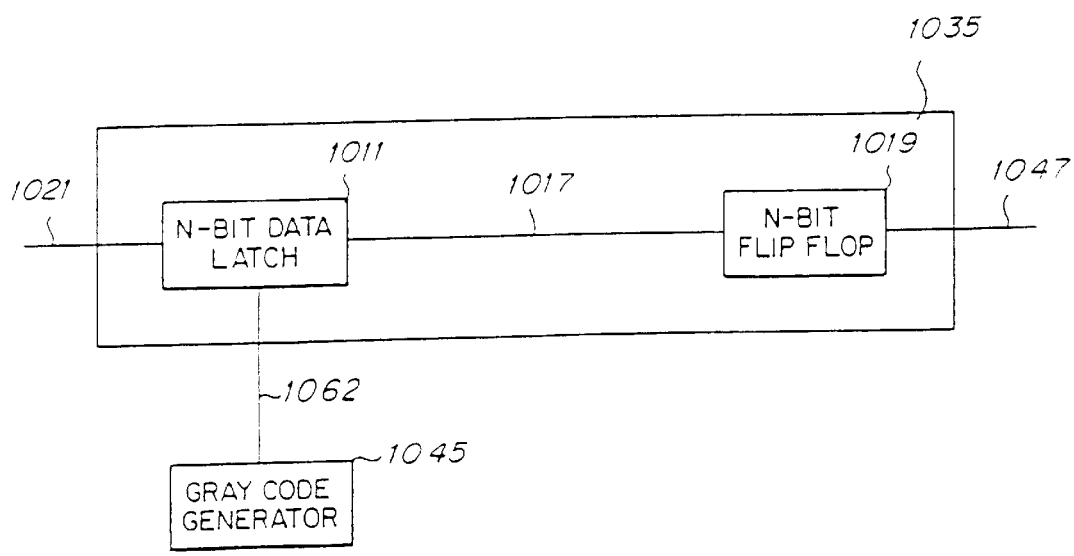
FIG. 13 is a schematic block diagram of the metastability resolving circuit illustrated in FIG. 12.

Reference is now made to FIG. 13, which illustrates the metastability resolving circuit 1035 in more detail. Comparator output signal 1021 is connected to the control input of an N-Bit data latch 1011. N is the number of bits of resolution that the analog signal 1015 is digitized (converted) into by the analog-to-digital converter. N can be any number and is typically between eight and sixteen for most applications. The N-bit data latch 11 data input is connected to the digital Gray code bus 1062 from the Gray code generator 1045. The data latched by the N-bit data latch 1011 (which is a code generated by Gray code generator 1045) is provided on line 1017 to N-bit flip-flop 1019. N-bit flip-flop 1019 resolves the metastability of the system by storing the data on line 1017 a predetermined time period after the N-bit data latch 1011 has stored the state of the Gray code generator 1045. The digital output 1047 is provided as described above.

Figure 14:
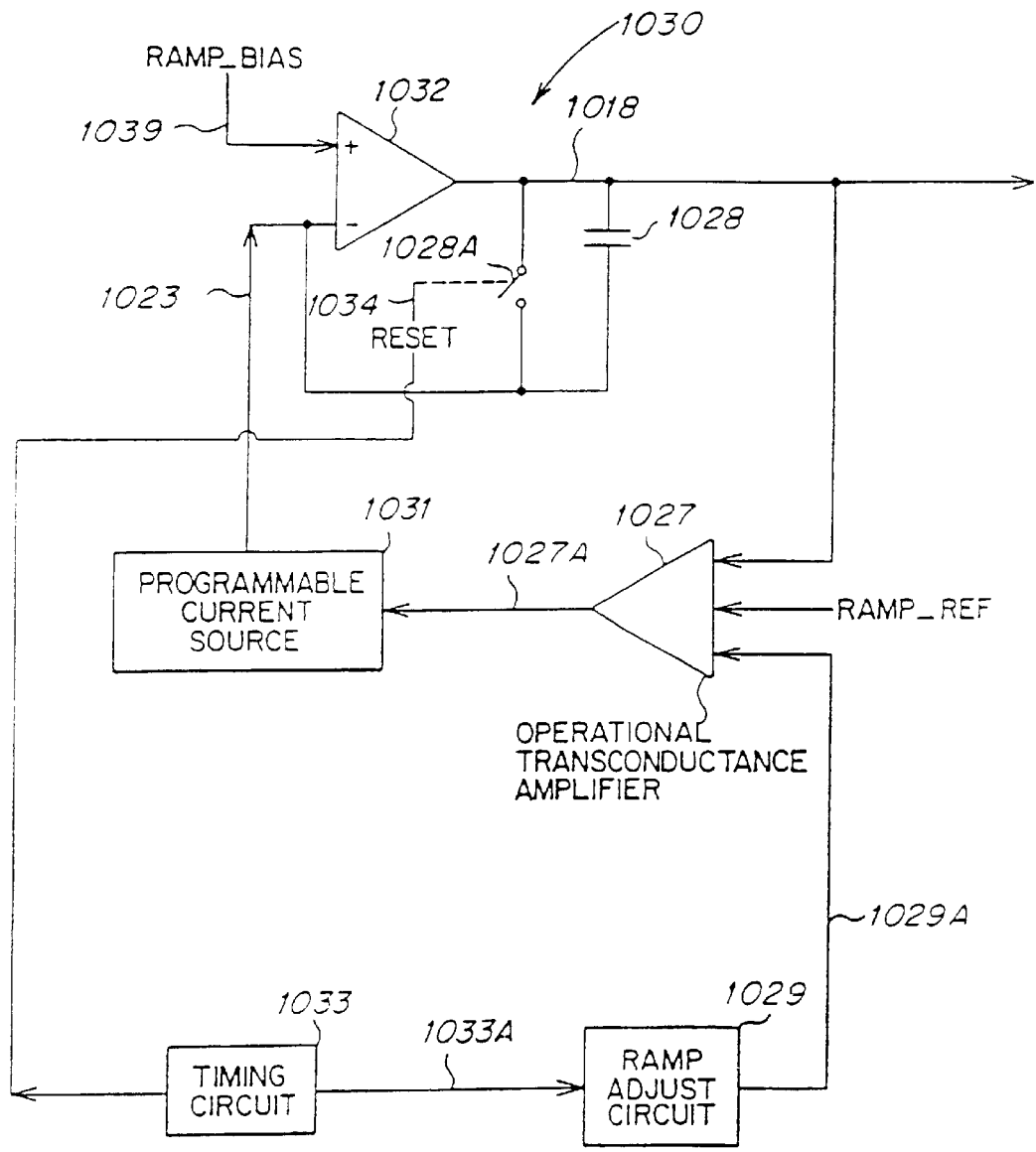
FIG. 14 is a schematic block diagram of the analog waveform generator illustrated in FIG. 12.

Reference is now made to FIG. 14, which illustrates a schematic block diagram of analog waveform generator 1030 illustrated in FIG. 12. Operational amplifier 1032 provides the analog ramp signal 1018 by providing an output signal to integration capacitor 1028. RESET signal 1034 is generated by timing circuit 1033 and activates switch 1028A to discharge capacitor 1028 when a new conversion is to be initiated. One input 1039 of operational amplifier 1032 is connected to a RAMP_BIAS signal and a second input 1023 is connected to the output of a programmable current source 1031. Programmable current source 1031 is controlled by operational transconductance amplifier 1027. Amplifier 1027 has a first input connected to the analog ramp signal 1018. A second input of amplifier 1027 is connected to a ramp reference voltage RAMP_REF. A third input of amplifier 1027 is connected to the output of ramp adjust circuit 1029. The starting voltage of the analog ramp is adjustable by changing the RAMP_BIAS voltage. The slope of the analog ramp signal 1018 is controlled by amplifier 1027. By changing the output of programmable current source 1031 in response to a current signal 1027A from transconductance amplifier 1027, the slope of the analog ramp signal 1018 can be changed. In response to control signal 1033A from timing circuit 1033, issued just before ramp signal 1018 is to terminate, ramp adjust circuit 1029, via control signal 1029A, turns amplifier 1027 on to sample the difference between the RAMP_REF voltage and the voltage of analog ramp signal 1018. Transconductance amplifier 1027 converts this voltage difference to a current 1027A that is used to control programmable current source 1031. After programmable current source 1031 has been adjusted, timing circuit 1033, via control signal 1033A, turns amplifier 1027 off to open the feedback loop, issues RESET signal 1034 to discharge capacitor 1028 using switch 1028A, and then opens switch 1028A to begin another integration cycle.

Figure 15:
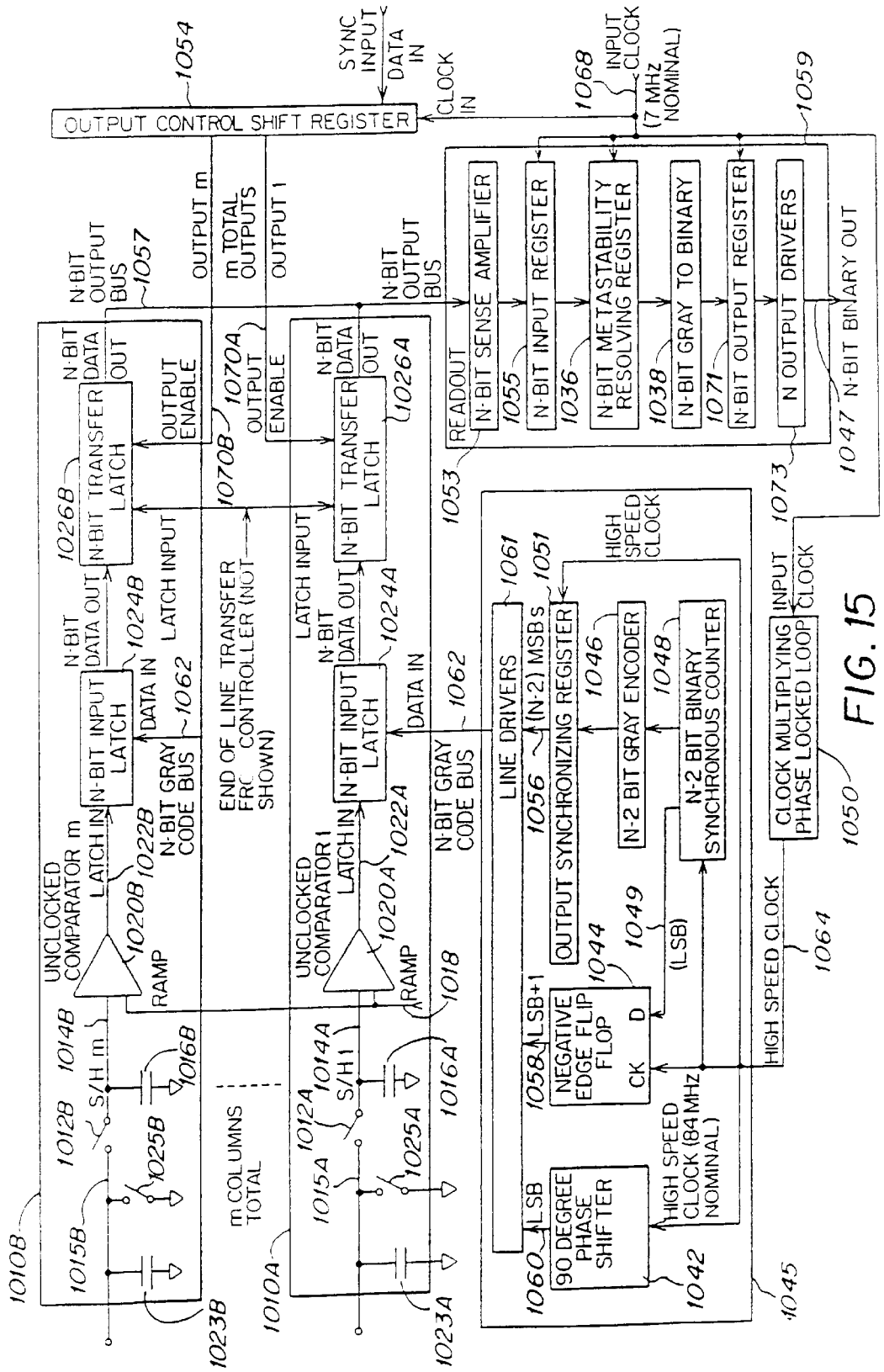
FIG. 15 is a schematic block diagram of an array of analog-to-digital converters according to the invention.

Reference is now made to FIG. 15, which is a schematic block diagram of parallel analog-to-digital converters 1010A and 1010B. Only two converters are shown for clarity; there could be m number of converters in an array. In one preferred embodiment there are 328 converters in an array. Each analog-to-digital converter is connected to the digital Gray code bus 1062 and an output bus 1057. The digital Gray code bus 1062 is connected to each data input of the m data latches. For clarity, only the connections to data latches 1024A and 1024B are shown. The data input of each data latch is driven by the gray code generator 1045. The N-bit output bus 1057 is connected to the data output of each transfer latch (latches 1026A and 1026B being illustrated) and is read by multiplexer readout circuit 1059.

The analog signal on line 1015A, the signal to be converted, is stored by capacitor 1023A until sampling switch 1012A is closed, thereby transferring the charge to capacitor 1016A. Capacitor 1016A integrates the analog signal 1015A until switch 1012A is opened. After a predetermined time interval has passed, switch 1012A is opened and switch 1025A is closed, thus resetting capacitor 1023A at the start of each conversion period. Those skilled in the art will recognize that any charge transfer device or circuit may be used to transfer the signal to be compared. During the read out phase the sampled signal 1014A is compared to an analog ramp signal 1018 by comparator 1020A. When the sampled signal 1014A is equal to or at some predetermined potential with respect to the analog ramp signal 1018, the output 1022A of the comparator 1020A activates latch 1024A. The output of the comparator 1020A is connected to the enable input of latch 1024A. The latch 1024A, connected to digital Gray code bus 1062, stores the state of the Fray code count at the time the analog ramp signal 1018 equals the sampled signal 1014A in response to comparator output signal 1029A. The output of latch 1024A is provided to a transfer latch 1096A. Output control shift register 1054, connected to transfer latches 1026A and 1026B, selects the output of a particular analog-to-digital converter from the array of converters. The output of each transfer latch is connected to sense amplifier 1053 via N-bit output bus 1057, part of multiplexer readout circuit 1059. Only one transfer latch is active and supplying an output to bus 1057 at any one time. The output control register 1054 is synchronized with input clock 1068.

Multiplexer readout circuit 1059 will now be described. One skilled in the art will appreciate that each of the circuit blocks in multiplexer readout circuit 1059 is N-bits side to accommodate the number of bits from each transfer latch. The output of sense amplifier 1053 is connected to the input of input register 1055 which is clocked by input clock 1068. Input register 1055 latches the data on N-bit output bus 1057 from whichever N-bit transfer latch has been enabled by output control shift register 1054. The output of register 1055 is connected to the input of a metastability resolving register 1036 that is also clocked by input clock 1068. Metastability resolving register 1036 is clocked so that one full clock cycle after the state of N-bit output bus 1057 has been latched into input register 1055, the data from input register 1055 is provided to the input of metastability resolving register 1036. Register 1036 resolves the metastability of the conversion that may have arisen when the digital signal on bus 1062 was latched by output signal 1022A from analog comparator 1020A. Circuit analysis of this latch train arrangement has indicated that the metastability of the system is improved by a factor of at least $2^{30}$ by the addition of metastability resolving register 1036. The output of the metastability resolving register 1036 is connected to a Gray code decoder 1038 that converts the Gray code signal to a standard binary signal. The Gray code decoder 1038 may use an exclusive-ORing (XORing) process in which the output of each latch in the metastability resolving register 1036 is exclusive-ORed (XORed) with an adjacent bit that has in turn been exclusive-ORed with another bit, and so on. The standard binary N-bit code output by Gray code decoder 1038 is provided to the data input of N-bit output register 1071, which latches the output value in response to input clock 1068. The output of output register 1071 is provided to N output drivers 1073 that provide the N-bit converted binary output signal 1047.

Input clock 1068 is also provided to a clock multiplying phase locked loop circuit 1050 that generates a high speed clock 1064. In one embodiment of the invention, the clock multiplier is a 12× clock multiplier. In one embodiment of the invention, for example, input clock 1068 is a 7 MHZ nominal clock and clock multiplier 1050 increases this by a factor of 12 to 84 MHZ.

Gray code generator 1045 will now be described. The digital Gray code on bus 1062, which in one embodiment of the invention is an N-bit binary gray code, is generated by concatenation of three bit streams: a least significant bit 1060, a next-to-least significant bit 1058 and a N-2 bit gray code word 1056. The high speed clock 1064 clocks an N-2 bit synchronous binary counter 1048. The N-2 bit synchronous counter 1048 provides an output signal to an N-2 bit Gray code encoder 1046. The Gray code encoder provides the N-2 most significant bits 1056 of the digital Gray code on bus 1062. Gray code encoder 1046 provides a Gray code by XORing each bit output by counter 1048 with an adjacent output bit.

The high speed clock 1064 and the N-2 bit synchronous counter's least significant bit 1049 is connected to a negative edge triggered flip-flop 1044. The negative edge triggered flip-flop 1044 provides the next to least significant bit signal, LSB+1 1058, as part of the digital Gray code on bus 1062.

The high speed clock 1064 is also connected to a 90° analog phase shifter 1042. The 90° phase shifter 1042 generates the least significant bit signal, LSB 1060, as part of the digital Gray code on bus 1062 by shifting the high speed clock 1064 by 90°.

In one example embodiment, N is equal to 13 bits, synchronous counter 1048 and Gray code encoder 1046 provide the 11 most significant bits on Gray code bus 1062. A 12th bit (LSB+1) is supplied by dividing a 75 (approximately) MHZ clock by two and then latching it with the falling edge of the 75 MHZ clock in flip-flop 1044. The 13th bit (LSB) is generated by delaying the 75 MHZ clock by precisely 90°, ¼ of a complete clock cycle, in closed loop phase shifter 1042. This type of phase shifter is sometimes referred to as a delay locked loop.

Figure 16:
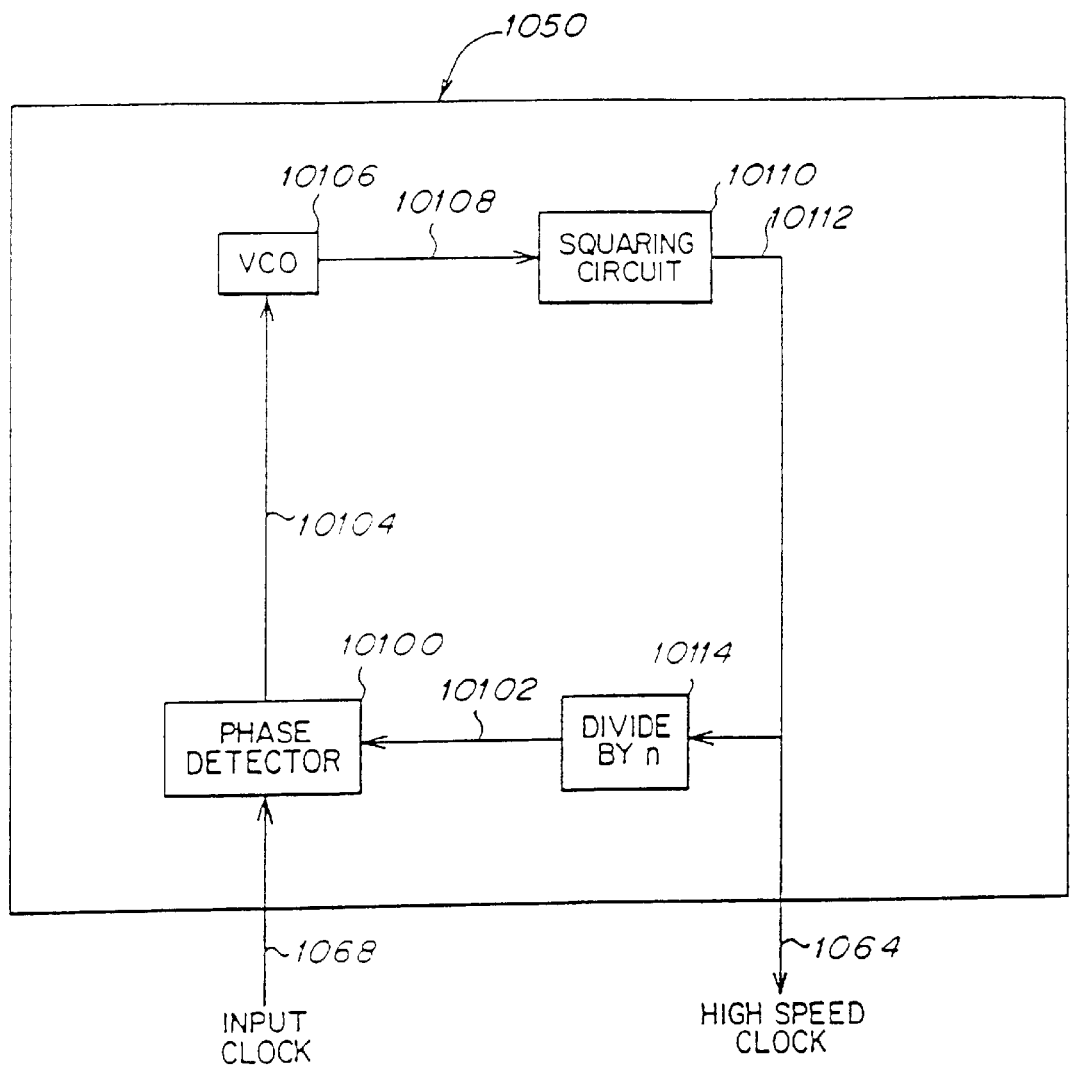
FIG. 16 is a schematic block diagram of the clock multiplying phase locked loop illustrated in FIG. 15.

Reference is now made to FIG. 16, which illustrates in more detail, the clock multiplying phase locked loop 1050 of FIG. 15. Clock multiplier 1050 includes a phase detector 10100 that detects a difference in phase between input clock 1068 and a frequency divided version of high speed clock 1064 on line 102. The output 10104 of phase detector 10100 is used to control a frequency multiplying voltage controlled oscillator (VCO) 10106. VCO 10106 increases the frequency of input clock 1068 by a predetermined factor. In one example, VCO 10106 increases the frequency of input clock 1068 by a factor of 12 to produce high speed clock 1064. The output 10108 of VCO 10106 is provided to a "squaring" circuit 10110. The function of squaring circuit 10110 is to shape the output signal 10112 so that high speed clock 1064 has a fifty percent duty cycle. i.e. a "square" output. High speed clock 1064 is also provided to a divide by n circuit 10114 that divides the frequency by a factor n so that the frequency of the clock signal delivered on line 10102 is equal to the frequency of input clock 1068. As discussed before, in one embodiment, if VCO 10106 increases the clock frequency by a factor of 12, then n would be 12 so that divide by n circuit 10114 reduces the frequency of high speed clock 1064 by a factor of 12 before providing that signal to phase detector 10100. In one embodiment, VCO 10106 may include a ring oscillator.

Figure 17:
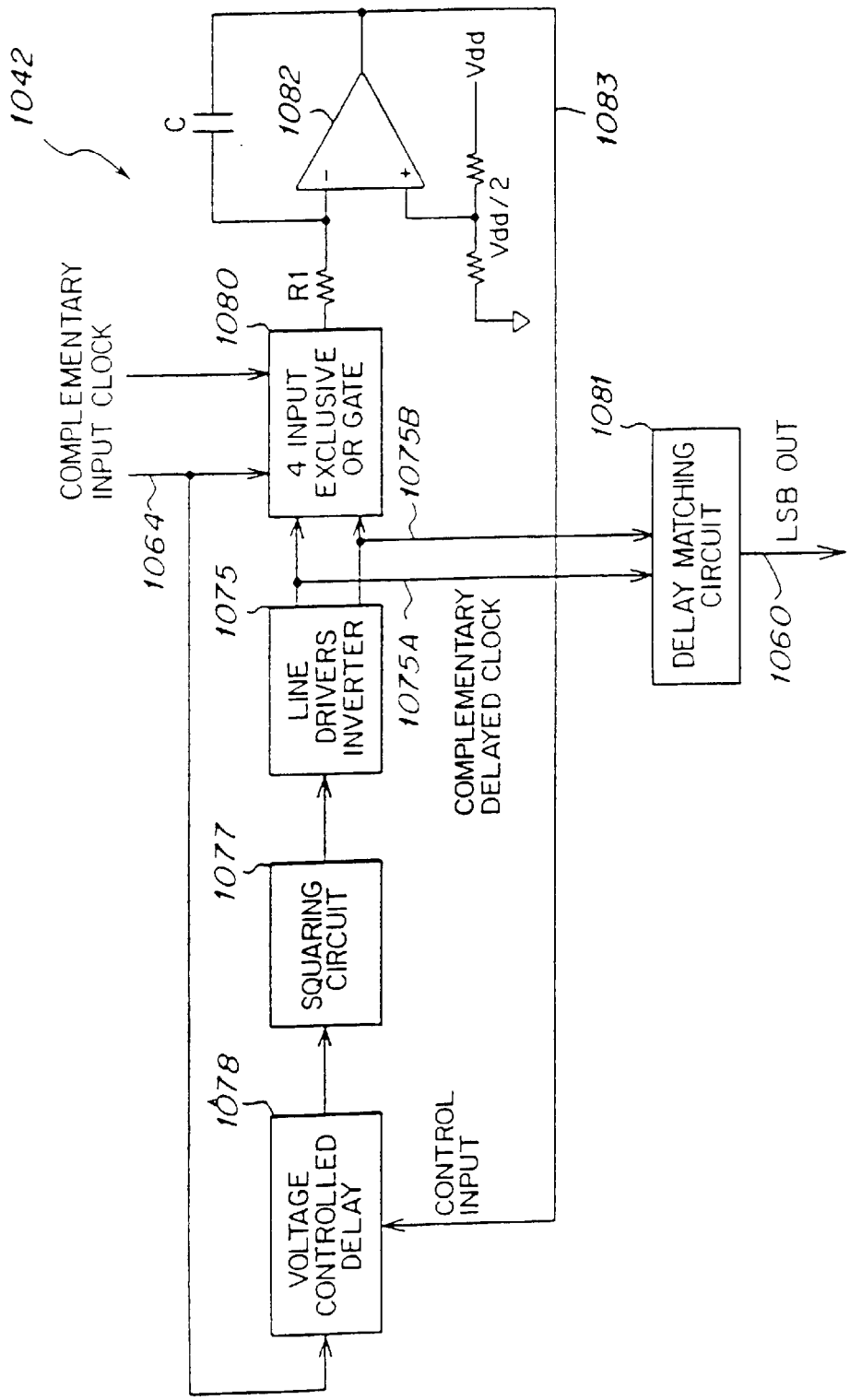
FIG. 17 is a schematic block diagram of the 90° phase shifter illustrated in FIG. 15.

Reference is now made to FIG. 17, which figure is a schematic block diagram of the 90° analog phase shifter 1042 illustrated in FIG. 15. High speed clock 1064 and its complement from clock multiplier 1050 are connected to the first and second clocking inputs of a four input exclusive or (XOR) gate 1080. XOR gate 1080 includes an output coupled to the inverting input of a high gain integrating amplifier 1082. Amplifier 1082 outputs a control signal 1083 which is coupled to a control input of a voltage controlled delay circuit 1078. The voltage controlled delay circuit 1078 also receives a clocking signal from the high speed clock 1064. The high gain of amplifier 1082 ensures that the delay is always 90° even in the presence of variations in component values and clock frequency. The voltage controlled delay circuit 1078 outputs a delayed signal in response to the control signal 1083 and clock 1064 to a "squaring" circuit 1077. Squaring circuit 1077 shapes the delayed signal so that it is symmetrical and has a fifty percent duty cycle (i.e., a "square" output) and outputs a signal to the input of line driver inverter 1075. Squaring circuit 1077 is similar to squaring circuit 10110, previously described. Line driver inverter 1075 outputs a first line driver inverter signal 1075A and a second line driver inverter signal 1075B to third and fourth inputs of the four input exclusive OR gate 1080. The first and second line driver inverter signals are also coupled to first and second inputs of a delay matching circuit 1081. Signals 1075A and 1075B comprise a complementary delayed clock. Delay matching circuit 1081 ensures that the delay experienced by each signal 1075A and 1075B is the same, so that the signals remain in the proper phase relationship with each other. The delay matching circuit 1081 outputs LSB 1060.

Figure 18:
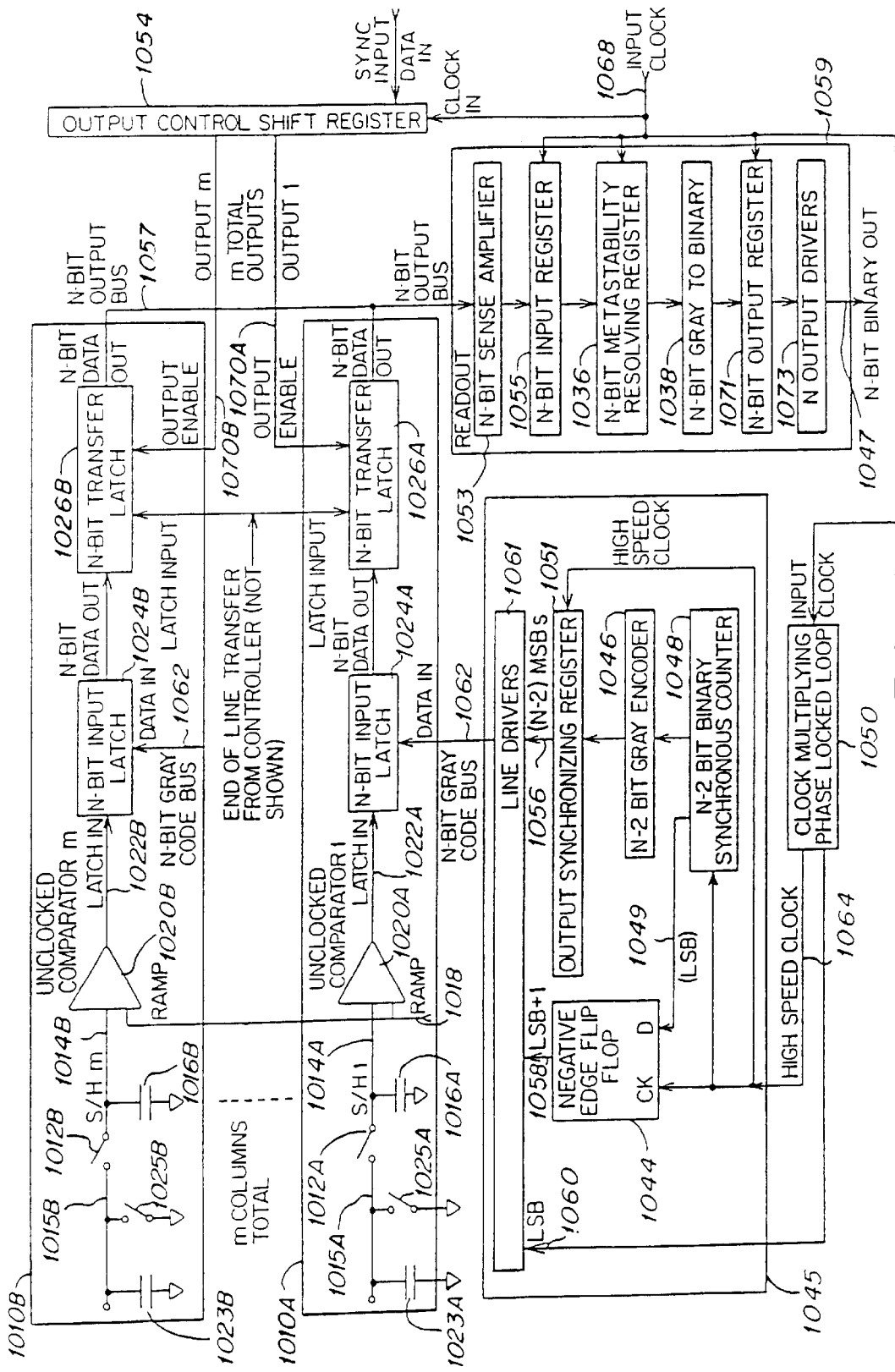
FIG. 18 is a schematic block diagram of an alternate embodiment of the circuit illustrated in FIG. 15.

Reference is now made to FIG. 18, which is a schematic block diagram of an alternate embodiment of the circuit of FIG. 15. In the circuit of FIG. 18, the 90° phase shifter 1042 of FIG. 15 has been eliminated. In addition, clock multiplier 1050 has been modified so as to provide LSB 1060 directly. In all other respects, the operation of FIG. 18 is the same as already described in connection with FIG. 15.

Figure 19:
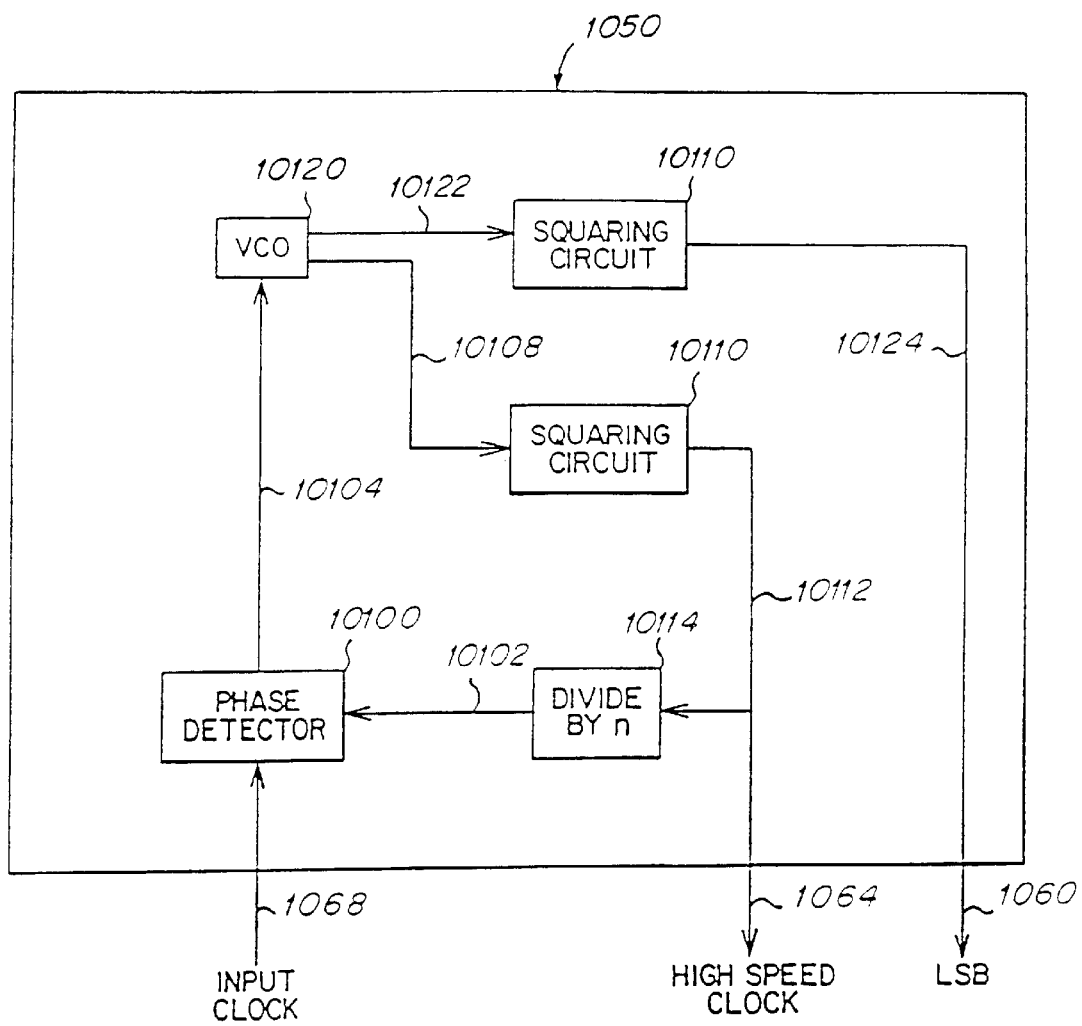
FIG. 19 is a schematic block diagram of a two phase voltage controlled oscillator and squaring circuit used in the circuit of FIG. 18.

Reference is now made to FIG. 19, which figure is a schematic block diagram of the clock multiplier 1050 of FIG. 18. In FIG. 19, as in FIG. 16, input clock 1068 is provided to a phase detector 10100 that provides a control signal 10104, in response to input clock 1068 and signal 10102, to a voltage controlled oscillator 10120. VCO 10120 also multiplies the output frequency provided on line 10108 to squaring circuit 10110 in order to generate high speed clock 1064 on line 10112. The output of squaring circuit 10110 on line 10112 is additionally provided to divide by n circuit 10114 that delivers control signal 10102 in the same manner as described in connection with FIG. 16.

VCO 10120 also provides a second output 10122 that is phase shifted 90° with respect to output 10108 and then provided to another squaring circuit 10110. Squaring circuit 10110 operates in the manner described in connection with FIG. 16 to provide a "square" output for the LSB 1060 on line 10124.

Figure 20:
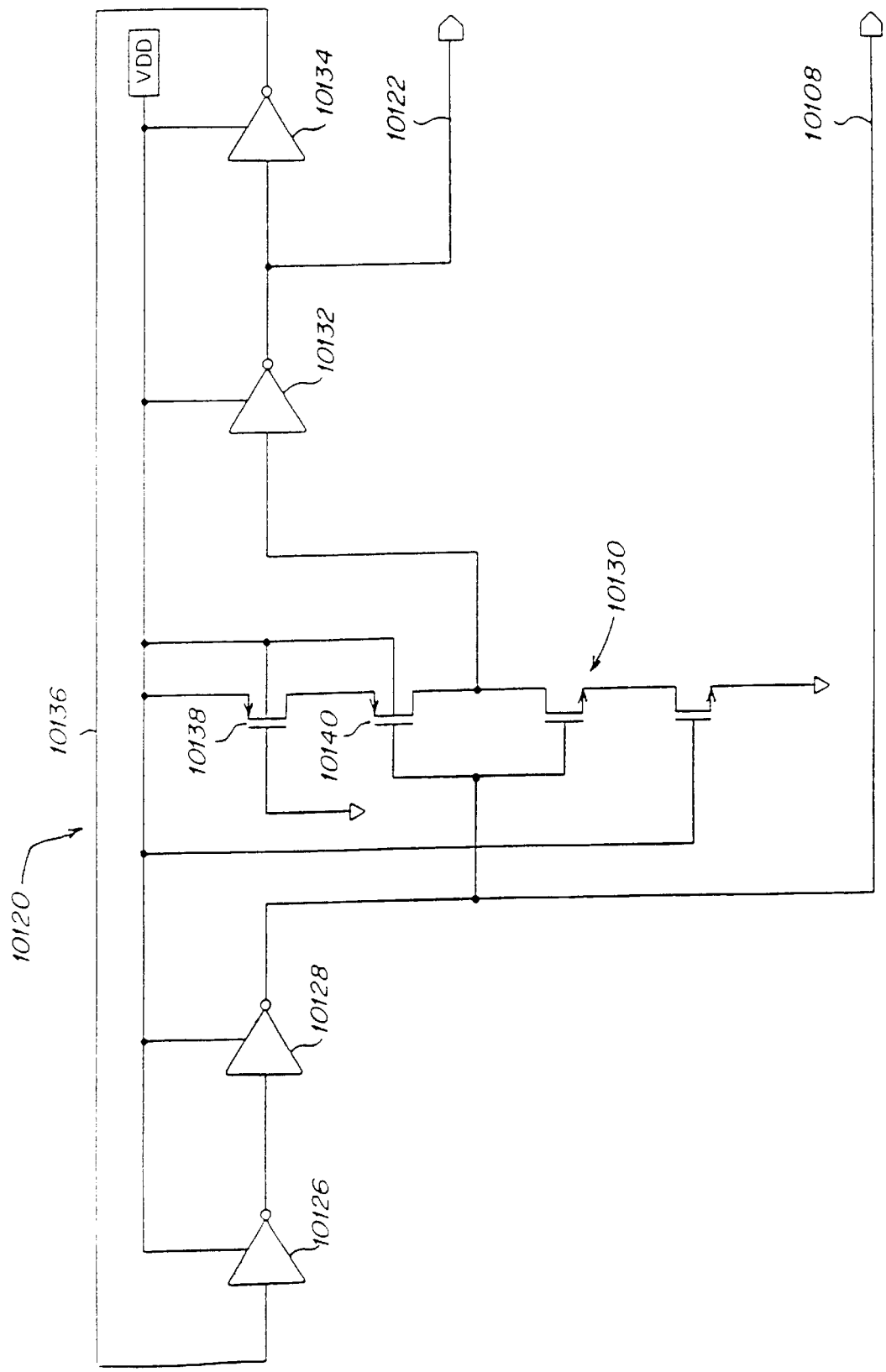
FIG. 20 is a detailed schematic circuit diagram of the voltage controlled oscillator illustrated in FIG. 19.

Reference is now made to FIG. 20, which figure is a schematic diagram of VCO 10120. VCO 10120 provides two outputs 10108, 10122 that are 90° out of phase from each other. VCO 10120 is a ring oscillator formed from an odd number of inverter stages connected in a loop. In particular, VCO 10120 includes inverters 10126, 10128, 10130, 10132, and 10134. The output of inverter 10134 is connected via line 10136 to the input of inverter 10126 in order to form the ring. If t is the time delay of one of the inverters and p is the number of stages in the oscillator, then the oscillation frequency f is:

$$f=1/(2pt) \tag{1}$$

Changing the frequency is accomplished by changing the power supply voltage of the inverter chain, thus changing time t. In the case of the CMOS inverter, the propagation delay increases as the supply voltage is decreased.

The phase shift per stage in the ring oscillator is:

$$\text{Phase/stage}=180/p \tag{2}$$

For example, in the five stage oscillator illustrated in FIG. 20, the phase shift per stage is 36°. Thus, a tap two stages away from the main output will have a 72° phase shift, while a tap three stages away from the main output will have a 108° phase shift. If all of the inverters are identical, then a 90° phase shift is not possible.

However, if the different inverters in the ring oscillator are not identically constructed, then a 90° phase shift between invertors in the ring oscillator can be obtained. In a CMOS inverter, the delay through the inverter depends upon a number of factors, including the size and shape of the component transistors and the amount of capacitive loading on its output. Adjusting any of these factors to increase the propagation delay of one of the inverters with respect to the remaining inverters in the ring can be used to provide the required 90° phase shift.

In VCO 120 illustrated in FIG. 20, the propagation delay of inverter 10130 is adjusted by adding two transistors 10138 and 10140 that are biased so as to always be in the on state. This increases the propagation delay through invertor 10130 so that the total delay through inverters 10134, 10126, and 10128 is about the same as the delay through modified inverter 10130 and inverter 10132. If the delay through inverters 10134, 10136, and 10128 is the same as the delay through modified inverter 10130 and inverter 10132, then there is exactly a 90° phase shift between is outputs 10108 and 10122.

Figure 21:
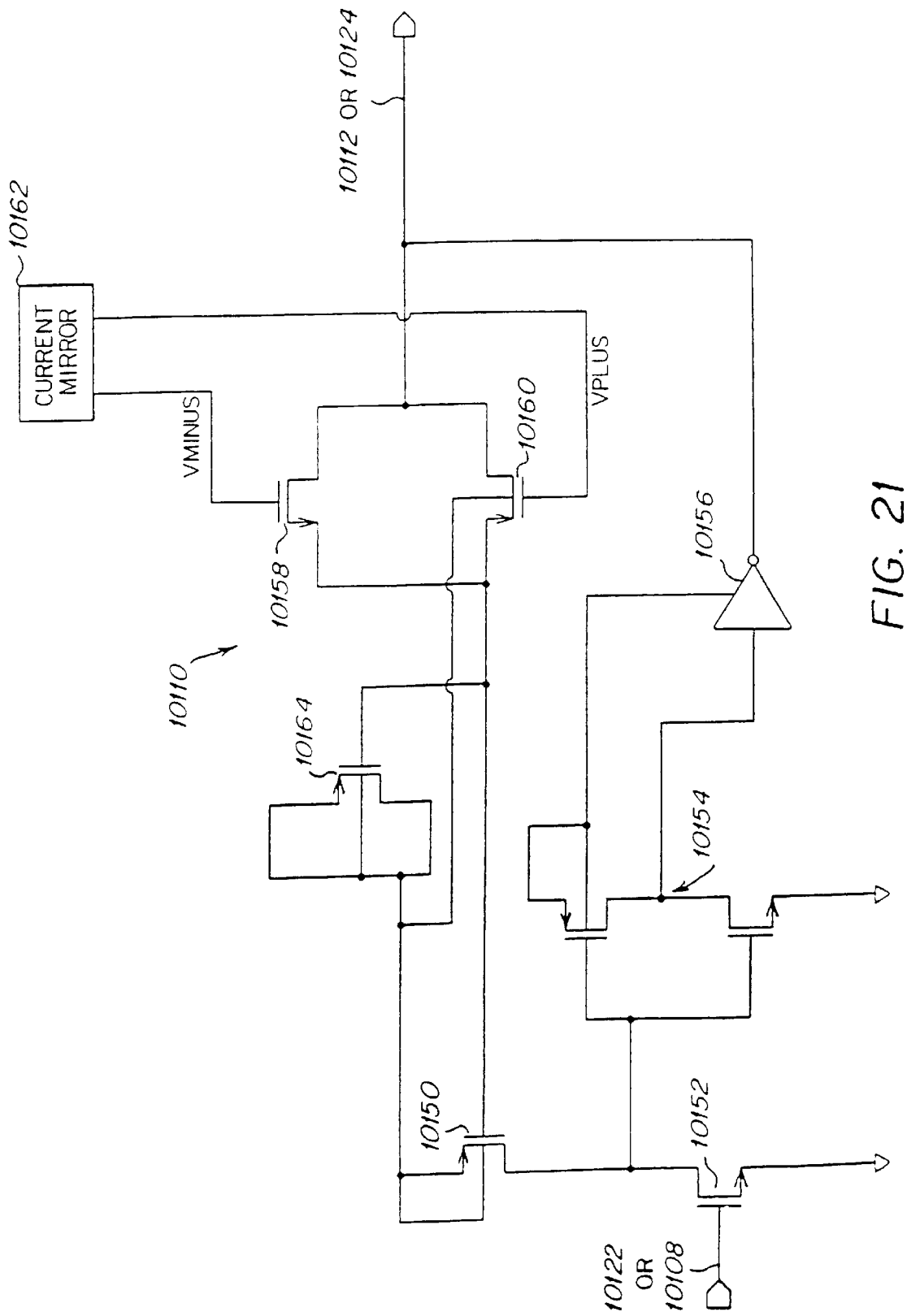
FIG. 21 is a detailed schematic circuit diagram of the squaring circuit illustrated in FIG. 19.

Reference is now made to FIG. 21, which figure is a schematic circuit diagram of squaring circuit 10110 illustrated in FIGS. 16 and 19. Squaring circuit 1077 in FIG. 17 also operates in the same manner as squaring circuit 10110.

As illustrated in FIG. 21, the output of VCO 10120 is provided to squaring circuit 10110. Obviously, in the case of the circuit illustrated in FIG. 19, two squaring circuits are provided, one for each output of VCO 10120.

Typically, VCO 10120 operates at a reduced voltage compared to the rest of the circuitry and therefore outputs 10108 and 10122 need to be translates, to the higher voltage level of the rest of the circuits. In addition, the propagation delay generally will not be the same for the rising and falling edges of the output signal and therefore the output of the level translator circuit will not be symmetrical, i.e., have a "square" output or fifty percent duty cycle, even though the signals internal to the ring oscillator are symmetric. Circuit 10110 thus incorporates the level translator into a closed loop feedback circuit that adjusts the input threshold as needed to maintain the symmetry of the output signal.

The level shifter includes transistors 10150 and 10152, and inverters 10154 and 10156. Two current source transistors 10158 and 10160 are controlled by voltages VMINUS and VPLUS. The voltages VMINUS and VPLUS are supplied by current mirror 10162 and control the amount of current delivered by the transistors 10158 and 10160. A feedback loop of signal 10112 or 10124 is provided through transistors 10158, 10160, transistor 10164, to level shifting transistors 10150 and 10152. If the waveform of output signal 10112 or 10124 becomes asymmetrical. i.e. not "square" transistors 10158, 10160 respond by changing the gate voltage on the input stage current source transistor 10150 in a direction that reestablishes symmetry of the output. Additionally, transistor 10164, used as a capacitor, filters out any ripple voltage and sets the response time of the feedback loop.

Figure 22:
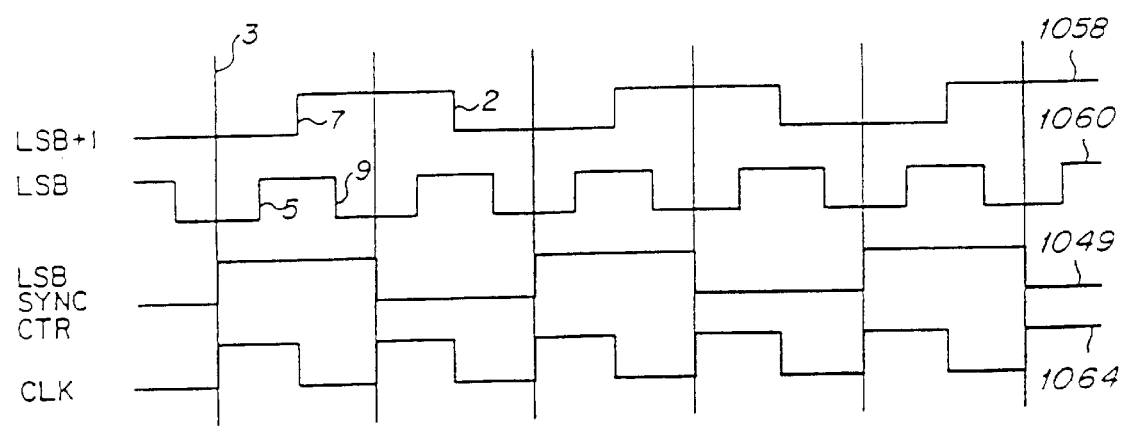
FIG. 22 is a timing diagram illustrating the temporal relationship among the least significant bits of the Gray code signal.

Reference is now made to FIG. 22, which is a timing diagram of the LSB 1060 and LSB+1 1058. The timing diagram of FIG. 22 illustrates the operation of either the circuit of FIG. 15 or the circuit of FIG. 18. The high speed clock 1064 transitions from low to high at time 3. The least significant bit 1049 of the N-2 bit binary counter 1048 transitions on the low to high transition of the high speed clock 1064. The LSB 1060, derived from the high speed clock 1064, transitions high at time 5 and low at time 9. The LSB+11058, derived from the counter least significant bit 1049, transitions high at time 7 and low at time 2. The N-2 most significant bits 1056 of the Gray encoded As signal transition only at time 3 while the LSB 1060 and LSB+11058 signals do not change at time 3. At times 2, 5, 7, and 9 only one of these signals changes at a time, thus meeting the Gray code requirement of having only a single bit change when there is a change in the count.

One skilled in the art will appreciate that rather than using an input clock having a frequency that is multiplied in order to provide a high speed clock, an external high speed clock could be used to control counter 1048, flip-flop 1044, and 90° phase shifter 1042.

One advantage of the present invention is that the Gray code least significant bit frequency may be equal to the frequency of the clock that is used to control the circuit. This means that the least significant bit frequency may be equal to the maximum toggle frequency for the flip-flop. Conventionally, for a typical Gray code, the master clock frequency is four times the frequency of the least significant bit of the Gray code. In the present invention, by contrast, the frequency of the least significant bit of the Gray code can be equal to the clock frequency. Therefore, the clock frequency is only limited by the inherent frequency limitations of the clock counter circuitry itself. This allows for higher conversion rates then conventionally achievable.

For a typical 2 micron CMOS process at room temperature, this frequency limit is about 150 MHZ, and about 500 MHZ at 80° K. For a typical 1 micron CMOS process, this frequency limit is about 500 MHZ at room temperature, and may be more than 1 Ghz at 80° K. In one embodiment of the invention, a 72 MHZ master clock generates a Gray code with 3.5 ns resolution which allows a 13 bit conversion in 30 µs. A 500 MHZ master clock generates a Gray code with 500 ps resolution, allowing a 16 bit conversion in 33 µs or 12 bits in 2 µs. With several hundred of these converters on one chip, the total conversion rate may be on the order of 100 MHZ. The estimated power is less than 50 µw per channel. As a result, the present invention allows the relatively slow single slope method of analog-to-digital conversion, when a array of such converters are used on a single chip, to provide relatively high conversion rates, while consuming low amounts of power. Furthermore, the simple design of single slope analog-to-digital converters saves power and allows integration of a large number of these converters on a single integrated circuit, particularly when using CMOS technology.

A Gray code count is used as the digital signal to be stored when the comparator is activated because, by definition, only one bit changes for each increment of the code. Since only one of the Gray coded bits can be in the process of changing when the latch is enabled, only one of the sampled bits can exhibit metastability, and the resultant code will be uncertain by only one least significant bit. This is in contrast to the case when a standard binary code is used as the digital signal to be stored. Since more than one bit may be changing for each increment of the code, a number of the sampled bits can exhibit metastability.

The use of a Gray code count also advantageously allows the metastability resolution to be determined at a point in the circuit where there is more time to complete it, thus reducing the power and speed requirements of the circuitry. As a result, in the present invention, the metastability resolution can be postponed until after the multiplexing of the data when the data rate is considerably lower than the rate at which the data is provided by each analog-to-digital converter. In particular, in conventional circuits, the metastability resolution might typically be provided when the binary code from a counter is clocked into the N-bit data latches. This might require the metastability resolution to be performed in a very short time interval at a relatively high clock rate. As noted, by contrast, the present invention can accomplish this function using a significantly lower clock rate, which reduces the power and speed requirements of the circuitry.

For example, a 75 MHZ (approximately) clock may be used to generate the Gray code. This 75 MHZ clock is generated from a 6 MHZ (approximately) input clock. The 75 MHZ clock is used only for the analog-to-digital conversion; the 6 MHZ clock is used for all other functions of the integrated circuit.

By using an array of 328 converters, a conversion is completed in approximately 30 microseconds with a resolution of 13 bits. A conventional approach requires a master clock frequency of approximately 300 MHZ, which is higher than the capability of, for example, a conventional 2 micron CMOS process. The use of a ray code allows the metastability resolution to be performed at a rate of 6 MHZ on 13 bits rather than 300 MHZ on 328 comparators.

The invention also provides a method of converting the analog signals from an array of analog-to-digital converters with a high effective clock rate, and increased resolution. A multitude of input signals, one for each converter, are sampled and held. Signals are formed by integrating the current from an analog source. This signal is held constant on a capacitor for the duration of the conversion process. Next, an analog ramp and a digital counter are simultaneously started. A comparator circuit compares the voltage of the ramp with the sampled and held voltage. When the two are equal, the output of the comparator changes state and causes the value of the digital counter to be stored in an N bit latch. The values stored in the array of latches, which are a digital representation of the various input voltages, are transferred in parallel to another array of latches. Then a new set of conversions can be performed while the results of the previous conversions are multiplexed to form a digital output signal.

For an array of converters, the digital counter and ramp generator are common to all converters. Each converter itself needs only a sample and hold, a comparator, and an array of digital latches.

The circuits of the present invention may be monolithically integrated in semiconductor form using conventional CMOS technology.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Apparatus comprising:
a plurality of sensors to detect radiation and to output image signals based on the detected radiation; and
processing circuitry to process the image signals and to output digital image data based on the image signals,
wherein the plurality of sensors and the processing circuitry are monolithically formed on a semiconductor substrate within a single integrated circuit chip,
and wherein the apparatus further includes:
at least one temperature sensing element to sense a temperature of the integrated circuit chip; and
a thermoelectric stabilizer to stabilize the temperature at a predetermined value,
wherein the at least one temperature sensing element is monolithically integrated on the semiconductor substrate with the plurality of sensors and the processing circuitry,
wherein the at least one temperature sensing element includes at least one sensor of the plurality of sensors, and
wherein the predetermined value is an average temperature of at least some of the plurality of sensors.

2. Apparatus comprising:
a plurality of sensors to detect radiation and to output image signals based on the detected radiation; and
processing circuitry to process the image signals and to output digital image data based on the image signals,
wherein the plurality of sensors and the processing circuitry are monolithically formed on a semiconductor substrate within a single integrated circuit chip,
and wherein the apparatus further includes:
at least one temperature sensing element to sense a temperature of the integrated circuit chip; and
a thermoelectric stabilizer to stabilize the temperature at a predetermined value,
wherein:
the at least one temperature sensing element includes a plurality of temperature sensing elements; and
the apparatus further includes means for determining an average temperature of at least some of the plurality of temperature sensing elements.

3. The apparatus of claim 2, further including signal processing means for calculating the predetermined value.

4. The apparatus of claim 3, further including temperature control means for controlling the thermoelectric stabilizer based on the average temperature and the predetermined value.

5. Apparatus comprising:
a plurality of sensors to detect radiation and to output image signals based on the detected radiation; and
processing circuitry to process the image signals and to output digital image data based on the image signals,
wherein the plurality of sensors and the processing circuitry are monolithically formed on a semiconductor substrate within a single integrated circuit chip,
the apparatus further including a plurality of switch pairs coupled to the plurality of sensors, each switch pair responsive to a sensor control signal to select one sensor of the plurality of sensors, wherein:
the semiconductor substrate includes an upper level and a lower level;
the upper level includes the plurality of sensors;
the lower level includes the plurality of switch pairs; and
a number of electrical connections connecting the plurality of sensors to the plurality of switch pairs is equal to a number of sensors plus one.

6. The apparatus of claim 5, wherein the plurality of switch pairs includes CMOS switches.

7. The apparatus of claim 5, wherein each switch pair includes:
a first switch connected between a common supply bus and a first terminal of the one sensor; and
a second switch connected between an image signal output bus and a second terminal of the one sensor, wherein the image signal output bus is electrically coupled to the processing circuitry.

8. Apparatus comprising:
a plurality of thermal sensors to detect at least thermal radiation and to output image signals based on the detected radiation; and
processing circuitry to process the image signals and to output digital image data based on the image signals;
wherein the plurality of sensors and the processing circuitry are monolithically formed on a semiconductor substrate within a single integrated circuit chip;
wherein the plurality of sensors is constructed and arranged as a two-dimensional grid;
wherein the processing circuitry includes row circuitry and column circuitry to select each sensor to output an image signal; and
wherein the two-dimensional grid includes a plurality of basic unit cells, each basic unit cell comprising:
one sensor of the plurality of sensors; and
a test transistor, connected in parallel with the one sensor, to output a test signal
that emulates the image signal output by the one sensor.

9. The apparatus of claim 8, wherein the processing circuitry includes test circuitry to activate the test transistor of each basic unit cell to output the test signal, the processing circuitry outputting the digital image data based on the test signal from each basic unit cell when the test transistor is activated.

10. The apparatus of claim 9, wherein:
the one sensor has a sensor resistance; and
the activated test transistor has an on-resistance that is substantially equal to the sensor resistance.

11. The apparatus of claim 8, wherein the two-dimensional grid includes columns of basic unit cells, each column having a column output to provide the image signals and the test signals from the basic unit cells, each basic unit cell further including a switch responsive to the row circuitry to connect the one sensor and the test transistor between a common supply bus and the column output.

12. The apparatus of claim 11, wherein the common supply bus is the ground.

13. The apparatus of claim 11, wherein for each column of basic unit cells, the processing circuitry includes:

an amplifier to receive the image signals and the test signals from the column output and to output an amplified column signal;

an integrator to integrate the amplified column signal; and an analog to digital converter to convert the integrated amplified column signal to the digital image data.

14. The apparatus of claim 13, wherein the amplifier is a buffered direct injection amplifier comprising:

a lateral bipolar input stage to receive the column output;

a current source load; and a pass transistor, coupled to the lateral bipolar input stage and the current source load, to output the amplified column signal.

15. The apparatus of claim 13, wherein the analog to digital converter includes:

a converter circuit to convert the integrated amplified column signal to a digital signal, the converter circuit including a first register to store the digital signal during a conversion period; and a metastability resolving circuit, coupled to the converter circuit so as to receive the digital signal, to store the digital signal at a predetermined time after the conversion period and output a metastability resolved digital signal based on the digital signal as the digital image data.

16. Apparatus comprising:

a radiation sensor to output image signals based on detected radiation, the radiation sensor including a plurality of radiation sensors; and a temperature sensor to output both a temperature signal representative of an ambient temperature of the radiation sensor and image signals based on detected radiation, the temperature sensor including at least one radiation sensor of the plurality of radiation sensors, wherein the radiation sensor and the temperature sensor are monolithically formed on a single semiconductor substrate.

17. The apparatus of claim 16, wherein:

the radiation sensor includes a plurality of radiation sensors; and each radiation sensor of the plurality of radiation sensors is substantially thermally isolated from another radiation sensor of the plurality of radiation sensors.

18. The apparatus of claim 16, further including means for stabilizing the temperature at a predetermined value.

19. The apparatus of claim 18, wherein the means for stabilizing the temperature includes a feedback circuit.

20. The apparatus of claim 19, wherein the feedback circuit includes a thermoelectric stabilizer.

21. Apparatus comprising:

a radiation sensor to output image signals based on detected radiation; and a temperature sensor to output a temperature signal based on a temperature of the radiation sensor, wherein the radiation sensor and the temperature sensor are monolithically formed on a single semiconductor substrate, the apparatus further including means for stabilizing the temperature at a predetermined value, wherein:

the radiation sensor includes a plurality of radiation sensors; and the predetermined value is based on an average temperature of at least some of the plurality of radiation sensors.

22. The apparatus of claim 21, further including means for determining the average temperature.

23. The apparatus of claim 22, wherein:

the temperature sensor includes the plurality of radiation sensors outputting a corresponding plurality of temperature signals; and the means for determining the average temperature includes processing circuitry to process the plurality of temperature signals and to output a control signal to the means for stabilizing the temperature.

24. The apparatus of claim 23, wherein at least some of the processing circuitry is monolithically integrated on the single semiconductor substrate.

25. The apparatus of claim 24, further including a vacuum package to seal the semiconductor substrate and the means for stabilizing the temperature.

26. Apparatus comprising:

a plurality of sensor unit cells arranged as a two-dimensional grid to detect radiation, each unit cell including:

a sensor to output an image signal based on the detected radiation; and a test transistor, connected in parallel with the one sensor, to output a test signal that emulates the image signal; and processing circuitry to process the image signals from the plurality of sensor unit cells and to output processed image data based on the image signals, wherein the plurality of sensor unit cells and the processing circuitry are monolithically formed on a semiconductor substrate within a single integrated circuit chip.

27. The apparatus of claim 26, wherein the processing circuitry includes test circuitry to activate the test transistor of each unit cell to output the test signal, the processing circuitry outputting the processed image data based on the test signal from each unit cell when the test transistor is activated.

28. The apparatus of claim 27, wherein:

the sensor has a sensor resistance; and the activated test transistor has an on-resistance that is substantially equal to the sensor resistance.

29. The apparatus of claim 26, wherein the two-dimensional grid includes columns of unit cells, each column having a column output to provide the image signals and the test signals from the unit cells, each unit cell further including a switch to connect the sensor and the test transistor between a common supply bus and the column output.

30. The apparatus of claim 29, wherein the common supply bus is the ground.

* * * * *